United States Patent [19]

Reese et al.

[11] Patent Number: 5,179,542
[45] Date of Patent: Jan. 12, 1993

[54] SIGNAL PROCESSOR

[75] Inventors: Sudha S. Reese, Portsmouth; Paul F. Neidhardt, Little Compton, both of R.I.

[73] Assignee: Raytheon Company, Lexington, Mass.

[21] Appl. No.: 815,657

[22] Filed: Dec. 31, 1991

[51] Int. Cl.[5] .................................. H04B 1/06
[52] U.S. Cl. ................................ 367/135; 342/159
[58] Field of Search .................... 367/100, 135, 136; 342/196, 159; 364/574; 455/63, 214

[56] References Cited

U.S. PATENT DOCUMENTS 4,622,552 11/1986 Andrews et al. .................. 342/196

OTHER PUBLICATIONS

Colburn, H. Steven, "Theory of Binaural Interaction Based on Auditory-nerve Data. I. General Strategy and Preliminary Results on Interaural Discrimination" 1973, The Journal of the Acoustical Society of America, vol. 54, No. 6, pp. 1458-1470.
Kroszczynski, Jan J., "Pulse Compression by Means of Linear-Period Modulation" Jul. 1969, Proceedings of the IEEE, vol. 57, No. 7, pp. 1260-1266.
Lyon, Richard F., "A Computational Model of Filtering, Detection, and Compression in the Cochlea" 1982 IEEE, pp. 1282-1285.
Seneff, Stephanie, "A Joint Synchrony/Mean-rate Model of Auditory Speech Processing," 1988, Journal of Phonetics, 16, pp. 55-76.
Simmons, James A., "A View of the World Through the Bat's Ear: The Formation of Acoustic Images in Echolocation" 1989, Cognition 33, pp. 155-199.

Primary Examiner—Daniel T. Pihulic
Attorney, Agent, or Firm—Denis G. Maloney; Richard M. Sharkansky

[57] ABSTRACT

A signal processor which operates on an incoming signal to separate the signal into locally compact wavelets in the time frequency domain is described. The processor includes means for separating an incoming signal into a plurality of signals, with said signals occupying one of a corresponding plurality of channels, with each channel having a predetermined passband characteristic. The processor further includes means for scaling the filtered signals from the plurality of channels by an estimate of background noise in the filter data and detector means fed by said plurality of scaled signals for integrating coherent components of said filtered scaled signals.

21 Claims, 13 Drawing Sheets

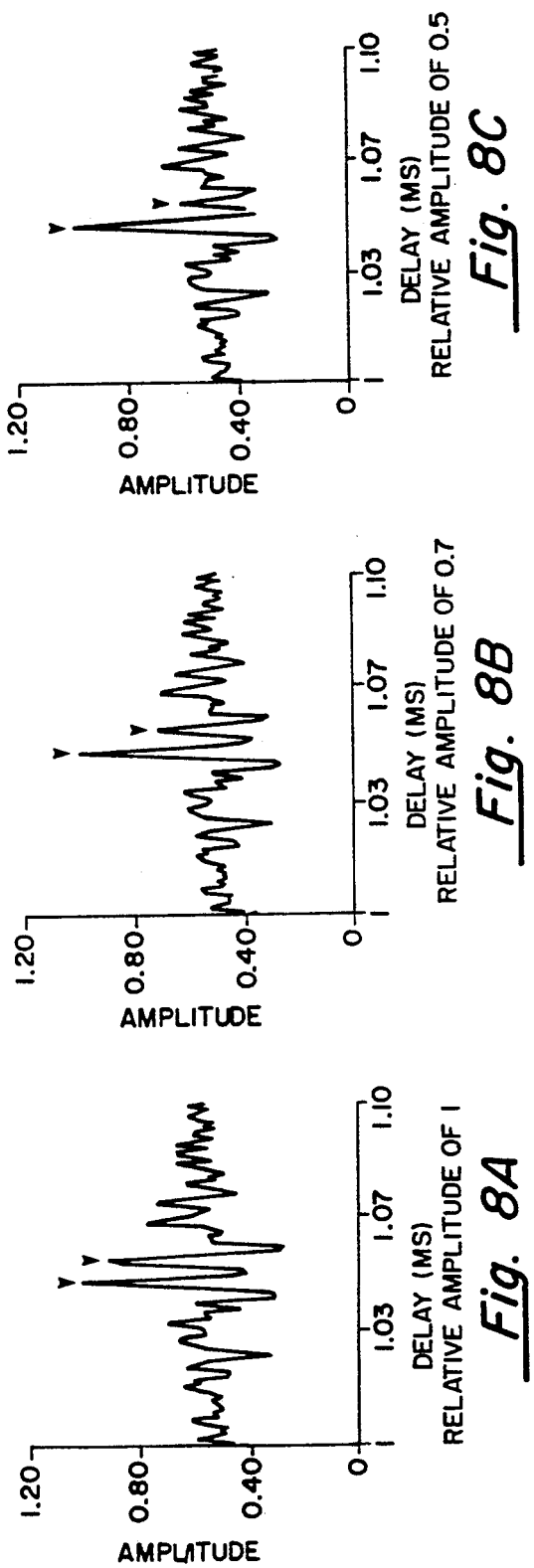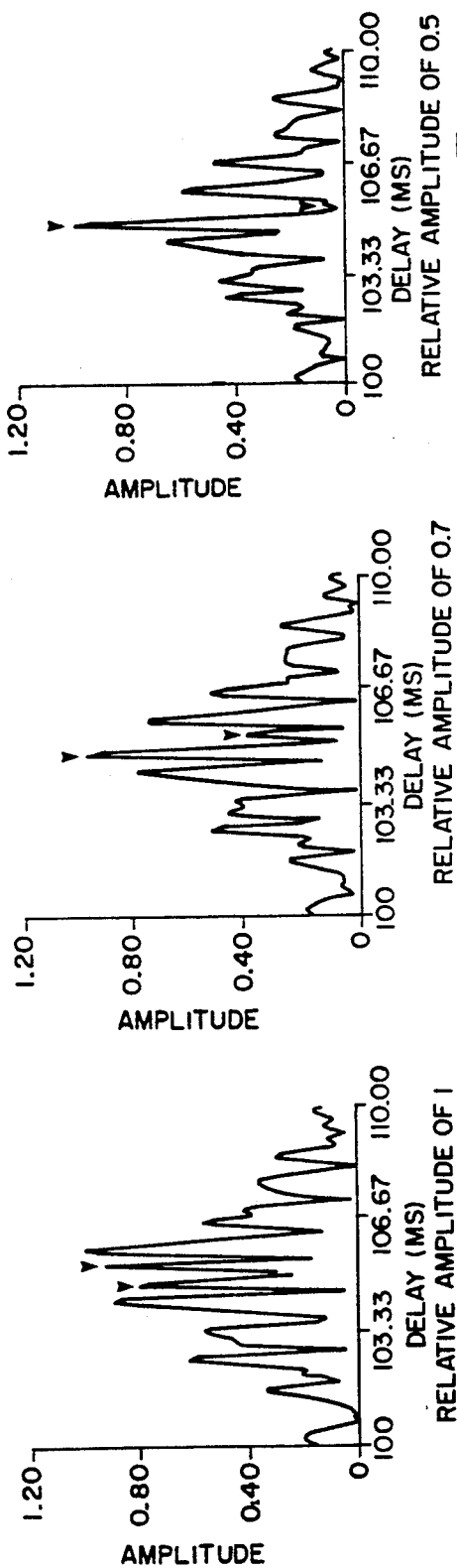

SIGNAL PROCESSOR

BACKGROUND OF THE INVENTION

This invention relates generally to receiving systems and, more particularly, to receiving systems adapted to receive energy and having signal processors used to extract information from said received energy.

As it is known in the art, systems such as, for example, communication systems, radar systems, sonar systems, and the like have a receiver which is used to detect the presence of energy and a signal processor which is used to extract information from the detected energy. In particular, with radar systems and sonar systems, the receiver is used to detect energy reflected from an object and extract information relating to the object from which the received energy was reflected. A problem common to radar systems and sonar systems is detecting the energy in the presence of noise and clutter (radar)-/reverberation (sonar) and extracting information from the detected energy with minimal loss due to noise and clutter/reverberation.

As it is also known in the art, radar systems rely upon the transmission of radio frequency energy in a propagating medium typically air to detect, map, or otherwise obtain information about a region in which the radar system is deployed. In particular, uses for radar include the detection, tracking, and identification of targets such as other radar systems, as well as objects travelling through the region covered by the radar system.

As it is also known in the art, sonar systems rely upon the transmission of sonic energy in underwater environments to detect, map, or otherwise obtain information about the region in which a sonar system is deployed. In particular, one of the uses for sonar is the detection and recognition of targets. Particular targets of interest for military vessels such as submarines, mine sweepers, and ships are mines and other underwater explosive type of devices, as well as other vessels such as other submarines.

A problem is encountered in using sonar to detect and recognize small targets such as mines and submarines particularly at long distances. Since sonar operates using acoustic waves to recognize such targets, it is necessary to obtain high fidelity images of the targets of interest by processing echos or reflections of acoustic energy. The representations of the targets such as mines and submarines should be of sufficiently high fidelity to permit such representations to discriminate against other non-target contacts such as topographic features on the bottom of the ocean floor, for example. Target imaging for such feature extraction is generally done with high frequency sonar. One problem, however, with using high frequency sonar is that absorption losses in water for high frequency acoustic energy are significant. High frequency acoustic signals are attenuated rapidly in ocean water thus mitigating against their use for long range detection and identification of small objects.

Conventional sonar systems perform tasks such as long range detection and recognition, often transmit sonar signals of lower than ideal frequency for the task of detecting and recognizing a target in order to acquire a potential target. Also, tracking of a target and recognition of a target may occur using a different sonar mode operating at high frequencies. In any event, received acoustic energy is processed by a sonar receiver to extract some information relating to the object from which the received echo energy originated.

Conventional receiving systems such as communication, radar, and sonar systems employ so-called matched filter processing to extract information from the received signal. In matched filter processing, generally energy such as electromagnetic energy for communication and radar systems or acoustic energy for sonar systems is transmitted having a known shape, pulse rate and frequency spectrum. Conventional receiving systems such as communication systems, radar systems, and sonar systems employ so-called matched filter processing in the receiver to extract information from a received signal. In systems such as communication and radar systems, generally electromagnetic RF energy is transmitted by a transmitter having a known shape, pulse width, and frequency spectrum, whereas for a sonar system acoustic energy having a known shape, pulse rate, and frequency spectrum is projected from a sonic projector. In radar and sonar systems, a portion of the transmitted energy is reflected from an object or target and a further portion of the energy is intercepted by an antenna (for radar systems) or hydrophone (for sonar systems). In communication systems, a portion of the transmitted energy is intercepted directly by an antenna and coupled to the communications receiver. In either event, since the transmitting system transmits energy having a known shape, pulse rate, and frequency spectrum, the transmitted characteristics of the transmitted energy can be filtered out or removed from the received energy by employing a matched filter. The matched filter has a filter response corresponding to the complex conjugate of the transmitted spectrum of the signal.

For sonar systems, acoustic energy from objects are received by a sonar hydrophone which converts the echo acoustic energy into electrical signals having a particular signal shape or waveform as well as frequency. The signals from the acoustic hydrophone are fed ultimately to a matched filter.

By filtering such received acoustic or electromagnetic energy with a matched filter, the filter effectively removes the spectrum of the transmitted signal leaving behind information relating to the acquired object. Matched filtering is a useful technique provided that signals of appropriate frequency can be transmitted and received from an object. Theoretically, an ideal matched filter processor provides a receiver having the highest signal to noise ratio.

Match filtering is thus employed in both RF (radar and communication) and acoustic (sonar) applications. However, several problems exist with match filtering particularly for acoustic processing in a underwater environment. For sonar systems, the processes that contribute to the formation of echos from underwater objects and targets are complex. For example, targets in an underwater environment are relatively rigid in comparison to high frequency sonar wavelengths and thus at high frequencies targets act as reflectors. However, at low frequencies where targets are more nonrigid, targets cause signal dispersion. Further, the propagation environment typically nonlinearly attenuates the acoustic energy as a function of frequency. This attenuation is particularly severe at high frequencies. Further, propagation characteristics of such acoustic waves are also affected by water depth, water temperature, and topographic features of the area. Thus, it is difficult to provide a match filter which would remove the transmitted spectrum of the signal, as well as compensate for changes introduced into the signal as a result of the propagation medium and non-ideal effects of the target.

Moreover, detection of underwater objects such as submarines and mines generally occurs against a background of clutter, such as immovable objects including the surface of the sea floor. In sonar systems, this background causes reverberations or multiple echos or reflections of the acoustic energy from such objects.

Mines and other such devices which are targets of interest for the sonar may also be buried on the sea floor bottom. While relatively low frequency acoustic signals can penetrate the sea floor, low frequencies will not provide echo returns which could be processed into images of high fidelity. While high frequency acoustic signals can provide echo returns which can be processed into high fidelity images, high frequency acoustic signals cannot sufficiently penetrate the sea floor. Accordingly, buried objects such as mines present a further problem concerning long range detection with minimum false alarm (or false detection) rates of occurrence.

Thus, long-range detection of small objects by conventional sonar systems employing matched filtering is fraught with many problems. It is desirable, therefore, when using matched filtering, to operate using lower frequencies having lower propagation losses to provide good long range detection. However, good long range recognition is difficult to provide with matched filtering techniques since lower frequencies will not provide images having sufficient fidelity or resolution to be recognized. Thus, although long-range detection is possible with low frequency sonar, long-range recognition of the detected object and discrimination of a true target from a false target is difficult.

Similar considerations also exist for RF systems such as radar and communication systems. For example, often radar signals must detect objects against a background of clutter. Further, multipath echoes can often affect receiver performance.

In general, although theoretically matched filter processing should offer the highest detectability for any received energy from a known transmitted signal, the presence of clutter and other media corrupting influences on the received energy make it difficult to design a receiver having a matched filter response which can not only remove the transmission spectrum from the received signal but also compensate for effects on such signals caused by clutter, reverberation, multipath, and other effects on the signal by the propagating median.

SUMMARY OF THE INVENTION

In accordance with the present invention, a signal processor includes means for separating an incoming signal into a plurality of signals, with said signals occupying one of a corresponding plurality of channels, with each channel having a predetermined passband characteristic and means fed by each one of said plurality of signals for integrating coherent components of said filtered signals. With such an arrangement, a processor which separates an incoming signal into a plurality of signal components and integrates each one of the signal components to reinforce coherent components of the signals is provided. That is, a multichannel processor which breaks up a echo return into locally compact wavelets in the time frequency domain is provided. These wavelets, when added in phase, reinforce coherent components in the signal return resulting in significant enhancement of estimation of signal parameters.

In accordance with a further aspect of the present invention, said means for integrating comprises means for integrating coherent components of said plurality of signals within each one of said passbands and across each of said passbands. With such an arrangement, such a detector reinforces coherent components of a received signal within each passband and across each passband thereby further improving estimation of signal parameters.

In accordance with a still further aspect of the present invention, a receiving system includes means for receiving energy and for converting said energy into electrical signals and means responsive to said electrical signals for providing a plurality of channels, each channel having a selected passband characteristic with said passband characteristic having a high frequency passband cutoff of at least about 200 dB per octave. The receiving system further includes means fed by said plurality of signals for scaling each of said plurality of signals by an estimate of background noise in each of said corresponding plurality of signals and means fed by each one of said scaled plurality of signals from said scaling means for integrating coherent components of said filtered, scaled signals within each one of said passbands and for integrating said integrated coherent component of said signals across each of said passbands. With this particular arrangement, a receiving system which separates an incoming signal into a plurality of signal components and reinforces coherent components of the signals is provided. This receiving system reinforces coherent components of a received signal. This technique improves the processing of receive signals particularly through media which effect the propagation characteristics of the received signal such as, for example, might occur in sonar processing of acoustic signals propagating through a sea water environment. The technique minimizes the effect of changes in the signal as a result of the signal propagating environment and non-ideal effects of a detected object. This technique also may be used for other receiver systems such as in radar and RF communication systems where the receive signal is substantially altered by the propagation medium and non-ideally effects of an object.

In accordance with a further aspect of the present invention, a system comprises means for transmitting a signal over a wide band of frequencies with said signal having a predetermined modulation characteristic and means for receiving energy in response to transmitted signal and for converting said received energy into electrical signals. The system further includes a plurality of bandpass filters, each one of said bandpass filters having a high frequency cutoff characteristic of at least about 200 dB per octave and means coupled to said plurality of bandpass filters for scaling signals from said bandpass filters by an estimate of background noise in said filtered signals and means coupled to said compression means for integrating coherent components of said filtered, scaled signals within each one of said predetermined passbands and for integrating said integrated components of said signals across each one of said passbands to provide an output signal. With this particular arrangement, a system such as a sonar or radar system which uses multichannel processing and coincident detection to reinforce coherent components of the wideband transmitted signal is provided. Further by appropriate choice of the modulation technique for the transmitted signal, the system can be used to discriminate against small objects at large distances such as, for example, long-range detection of mines or other small objects against a background of clutter such as the surface of the sea floor or alternatively may be used in long-range detection and recognition of objects as would be accomplished by a radar system for example.

BRIEF DESCRIPTION OF THE DRAWINGS

The foregoing features of this invention, as well as the invention itself, may be more fully understood from the following detailed description of the drawings, in which:

FIGS. 7A-7C are highlight plots of amplitude (dB) versus delay (milliseconds) for echo returns having various frequency attenuation effects from a filtering arrangement employing match filtering in accordance with the prior art;

FIGS. 8A-8C are plots of amplitude (dB) versus delay (milliseconds) of highlights from echo returns having various frequency attenuation effects processed in accordance with the filtering and coincident detection of the present invention;

DESCRIPTION OF THE PREFERRED EMBODIMENTS

Figure 1:
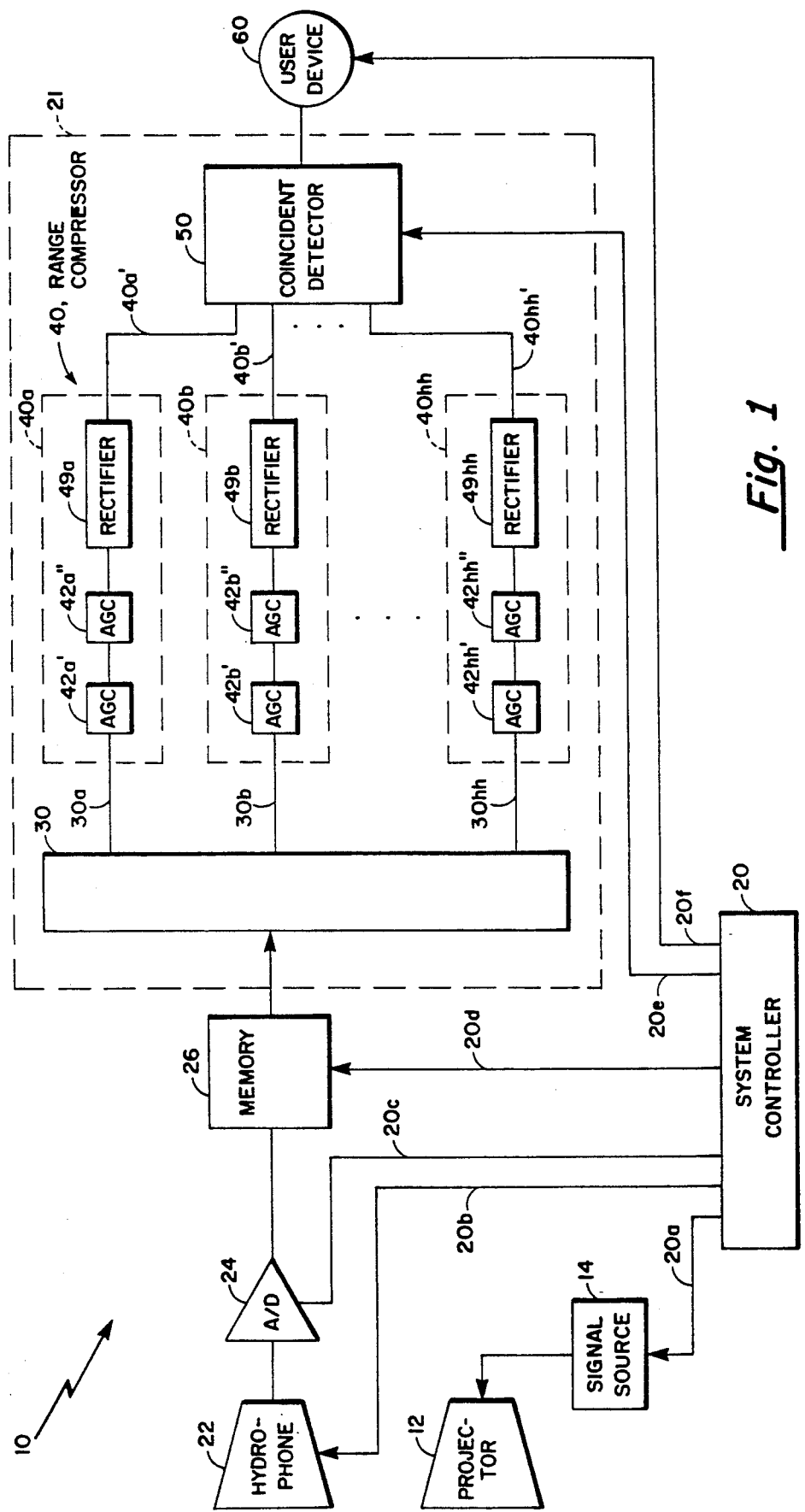
FIG. 1 is a block diagram of a system, here a sonar system, according to the present invention.

Referring now to FIG. 1, a sonar system 10 is shown to include a transmitter element 12 here a projector which may be any suitable underwater acoustic transmitting type of element such as a flextensional transducer and so forth. Transducer 12 is fed a signal from a signal source 14 which provides a frequency modulated, wideband signal (i.e. generally greater than two octaves). Signal source 14, as well as other elements of the sonar, are controlled via system controller 20 or other suitable control along control paths 20a-20f as would be known to one of ordinary skill in the art.

During a transmit mode of operation, a signal is thus provided from system controller via line 20a to the signal source 14 to provide a suitably modulated transmit signal to be transmitted via projector 12. In response to the suitably modulated signal fed to projector 12, projector 12 produces acoustic energy in the medium here water, with the acoustic energy having the spectrum provided by the transmitted signal. This acoustic signal propagates in all directions or selective directions. When the acoustic signal encounters an object such as a target, sea floor (cluttered) or large fish, etc. the acoustic energy is bounced off of the object and portions of such energy are intercepted by a hydrophone or bank of hydrophones 22.

Thus, during a receive mode after a period of time has elapsed from the end of the transmission from projector 12, a signal along line 20b is provided from system controller 20 to enable hydrophone 22 to respond to echoed or returned acoustic signals produced as a result of the reflection of the transmitted energy. Echo signals (not shown) are thus received by hydrophone 22 which here is responsive to energy having frequencies over a relatively wideband such as two octaves or greater and preferably due to the relative broadband characteristics thereof is a polymer type of hydrophone as is known in the art.

Hydrophone 22 converts received acoustic energy into electrical signals. Such signals are fed through an amplifier or other preconditioning circuits (not shown) and then fed to an analog-to-digital converter 24. Preferably signal preconditioning circuits such as low noise amplifiers and buffer amplifiers are relatively wide-band amplifiers and are further characterized as having relatively low levels of phase dispersion over the bandwidth of the amplifier. That is, the amplifiers impart to the amplified output signal a substantially equal phase shift to the amplified output signals therefrom at least over the bandwidth of the transmitted signal. Further, the sampling rate of the A/D converter is greater than twice the Nyquist sampling frequency (i.e. greater than twice the frequency of the highest frequency component signal in the input spectrum). Preferably the input signal is over sampled and thus the sampling rate is at two and a half to three times the highest input frequency.

Analog-to-digital converter 24 converts the signals provided from hydrophone 22 in accordance with the sampling rate fed along line 20c into a stream of digital words. At the output of analog-to-digital converter 24 such stream of digital words are stored in a buffer memory 26 also under control of system controller 20 via signals on lines 20d. After a sufficient amount of data has been collected in memory 26, the data are fed to receiver processor 21 which here includes a filter bank 30. Filter bank 30 is comprised of a plurality of bandpass filters (not shown) with each one of said bandpass filters having an asymmetric frequency response characteristic. In particular, the frequency response characteristic of each of the filters is selected to enhance processing of coherent components of the signal. In particular, the filter response is characterized as having a relatively sharp roll off or skirt at the high frequency side of the passband of the filter. The filter response of the filters is here much greater than 6 dB per octave. Preferably the frequency response is better than 200 dB/octave. Here, a relatively shallow roll off or "skirt" characteristic is provided at the low frequency side of the passband. However, the characteristic of the low frequency side is not particularly important. Since the low frequency side of each of the bandpass filters is relatively not steep or sharp the passband characteristic is asymmetric. Here the signals from filter bank 30 are provided at outputs 30a–30hh. Thus, filter bank 30 here includes thirty-four individual bandpass filters although any number of filters greater than two could alternatively be used.

Each of output lines 30a–30h are fed to a corresponding one of a plurality of nonlinear range compressors 40a–40h with here said range compressors being referred generally to range compressor 40a–40h bank 40. Each of the range compressors include a pair of cascaded, automatic gain control circuits 42a′, 42a″–42h′, 42h″ having short and long adaptation rates and a half wave rectifier 49a–49hh coupled to a last one 42a‴, 42h‴ of the "AGC" circuits 42a′, 42a″–42h′, 42h″. The half wave rectifier uses a hyperbolic tangent mapping algorithm to assign values of the input signal from the AGC stages to certain values of TANH for selective delays and saturation levels, as will be discussed in conjunction with FIG. 2C. The non-linear range compressor 40 is used to obtain an estimate of the background noise and normalize the input data fed to it by the estimate of the background noise in the channel. The half wave rectifier portion of the compressor 40 is used to provide a steep transition between background signal level of the data after scaling coherent components of the echo signal.

The dynamic non-linear range compressed signals at outputs 40a′–40hh′ of the bank 40 are fed to a coincident detector 50. The coincident detector 50 combines each of the detected signals from each of the signal banks. The detector 50 sums or integrates the returns in each channel to reinforce coherent components of the signal from each of the filter banks and sums the integrated returns in each channel across each of the channels of the filter to provide a sum of the coherent components of the received signal as will be described. Given a sufficiently large number of filter banks in the filter 30 such that there is only one coherent component per channel, the coincident detector 50 would integrate coherent components only across all of the channels.

The output of the coincident detector 50 is fed to a user device 60 such as a display or signal processor for further action such as target identification. In general, each of the elements described in conjunction with FIG. 1 is under control of system controller 20 which provides appropriate control signals in a proper sequence to permit complete processing of data from the hydrophone 22 through user device 60.

Figure 2:
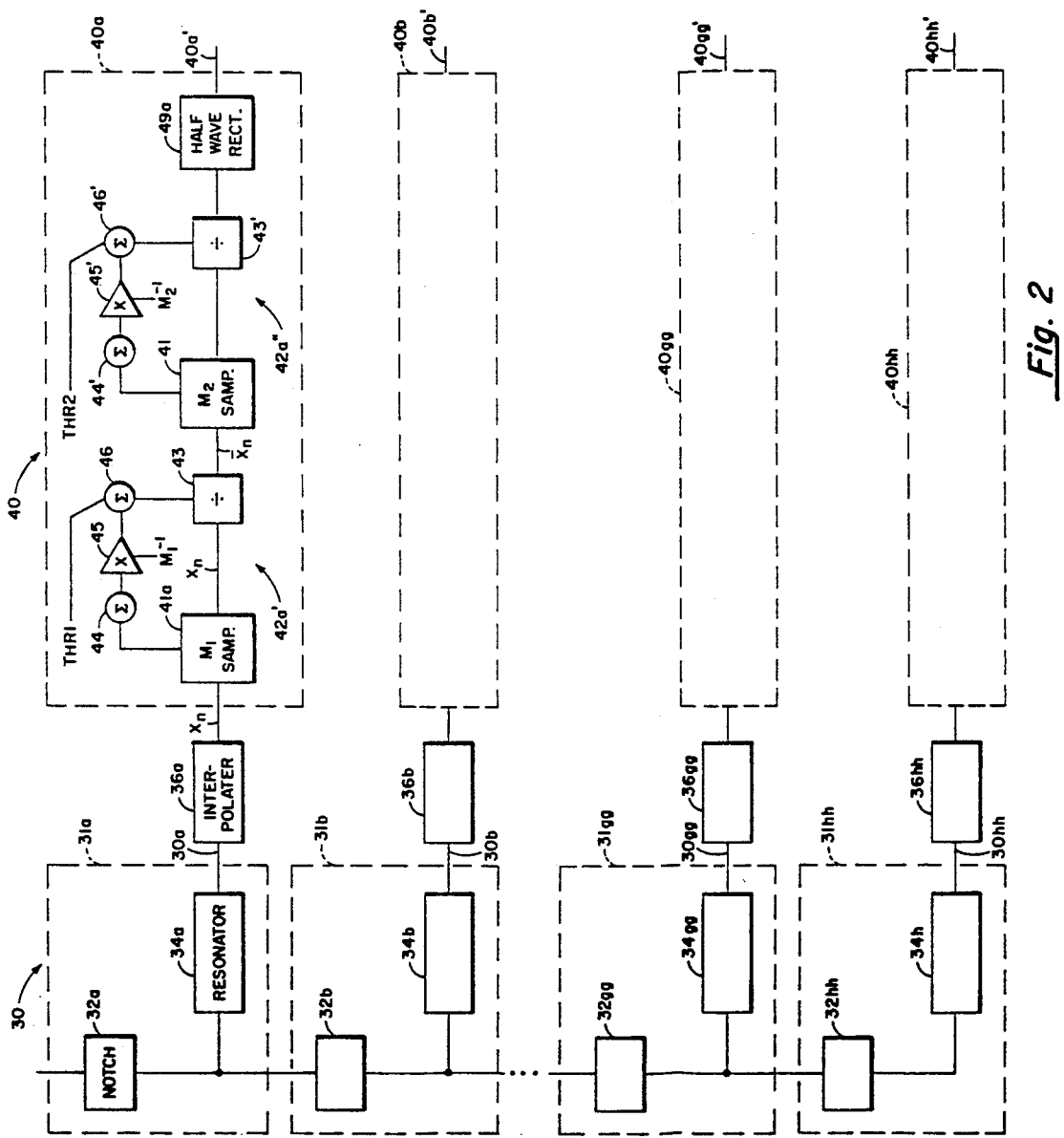
FIG. 2 is a block diagram of a portion of the sonar system shown in FIG. 1.

Referring in particular to FIG. 2, the hyperbolically frequency spaced bandpass filter bank 30 is shown to include a plurality of filter stages here 31a–31hh representing thirty-four of such filter stages although any number of plural stages may be used. Each of said filter channels 31a–31hh is shown to include a notch filter 32a–32hh, respectively, coupled to a resonator 34a–34hh. Notch filters 32a–32hh are successively coupled in series whereas resonators 34a–34hh are coupled between adjacent notch filters, as shown, with the output of the resonators providing outputs 30a–30hh of the filter network 30.

The outputs of filter channels 31a–31hh are coupled to interpolators 36a–36hh and the outputs of interpolators 36a–36hh are coupled to corresponding nonlinear dynamic range compressors 40a–40hh, as will be described below.

Returning, in particular, to filter bank 30, each of the bandpass channels 31a–31hh are characterized as providing a relatively steep filter response or skirt at the high frequency end of the passband of each of the channels 31a–31hh In particular, at low frequencies each bandpass filter 31a–31hh of the filter bank 30 here has a relatively shallow "roll off," whereas at high frequencies the filter bank 30 has a relatively sharp roll off of preferably about 200 dB/octave or greater. Each of these filter banks are cascaded together and further each of the filter banks has a center or nominal resonant frequency. The resonant frequency of each of the channels is spaced in frequency, as will be described below. Because the low frequency side of the passband is here not well developed its response is shallow or not as steep as the high frequency side of each of the filter channels. Thus each filter channel has an asymmetric passband frequency characteristic which overlaps a passband of preceding one of the channels. The sharp high frequency roll-off response of each of the bandpass filters 31a–31hh permits good frequency discrimination and further permits relatively good time resolution since the spaced bandpass filters are relatively wideband.

Figure 2A:
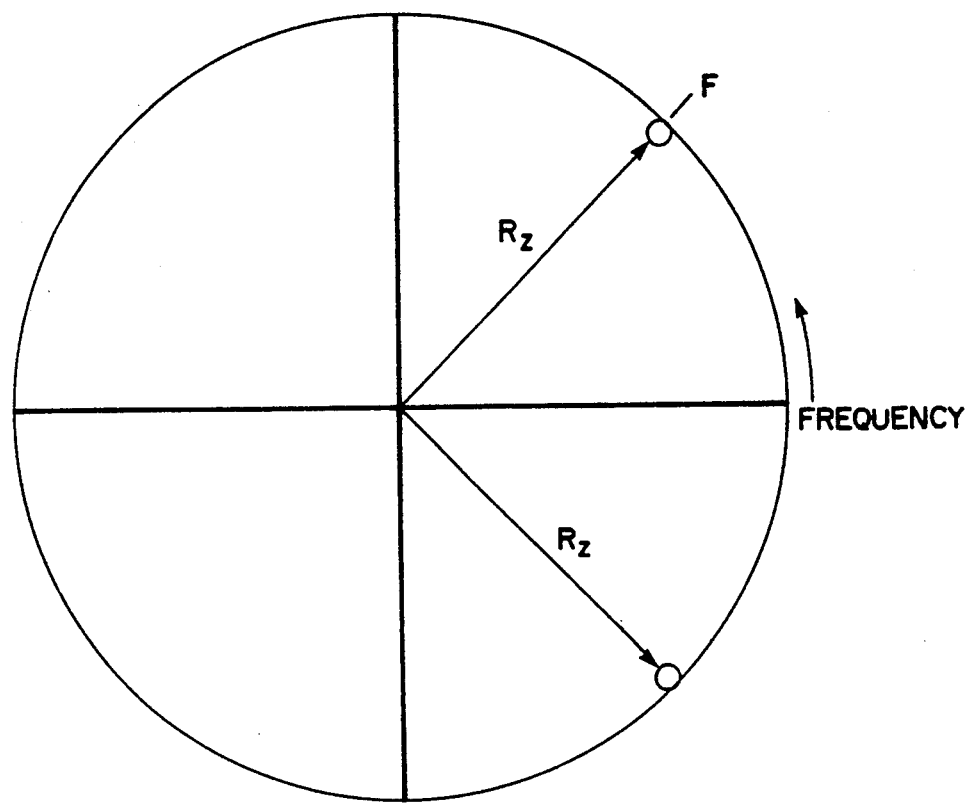
FIG. 2A is a plot of a location and response of a zero only notch filter.
Figure 2B:
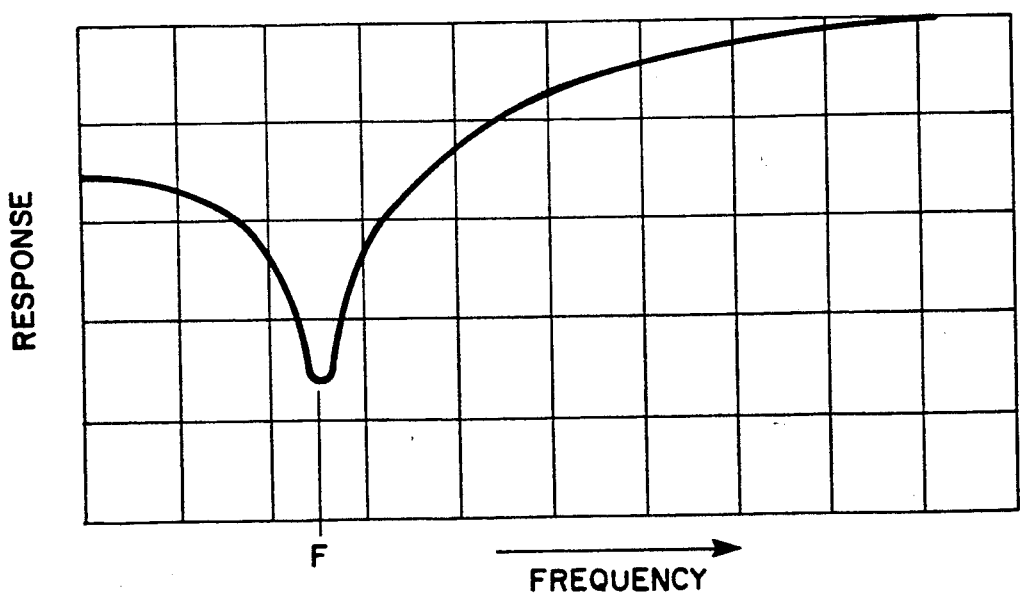
FIG. 2B is a plot of a location and response of a zero/pole notch filter.
Figure 2C:
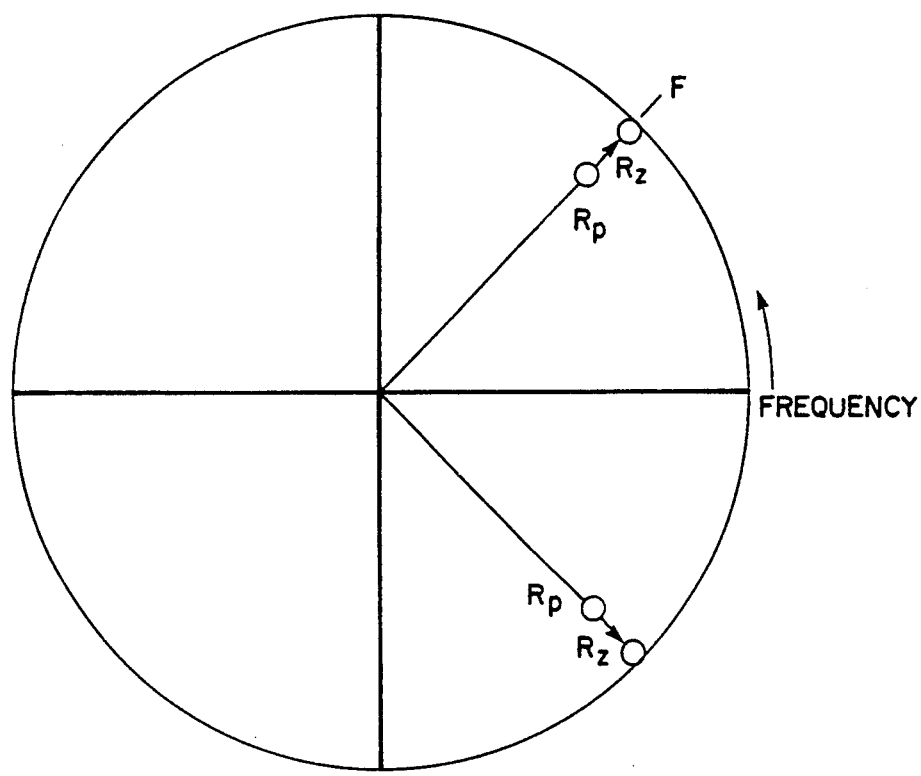
FIG. 2C is a plot of a half wave rectifier transfer function.
Figure 2D:
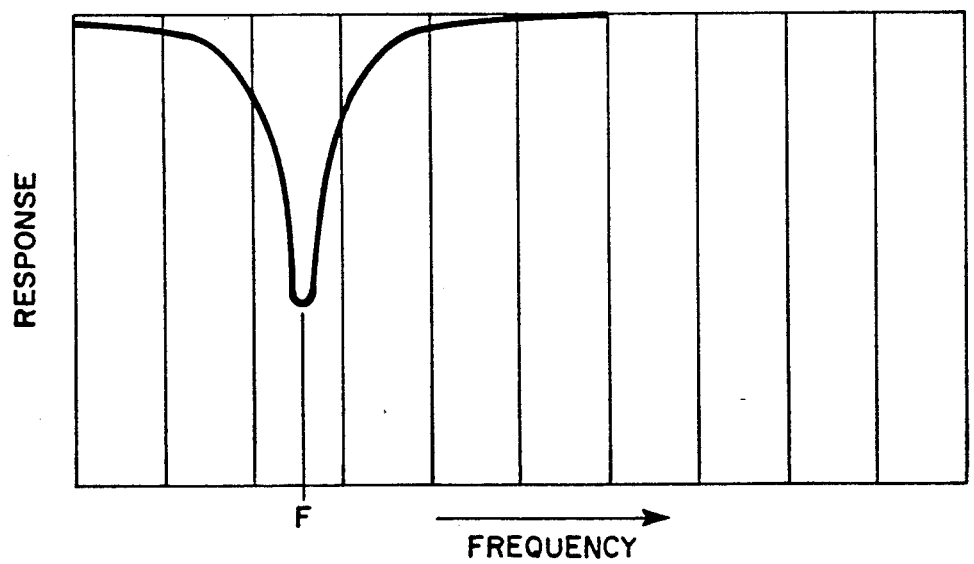
Figure 2E:
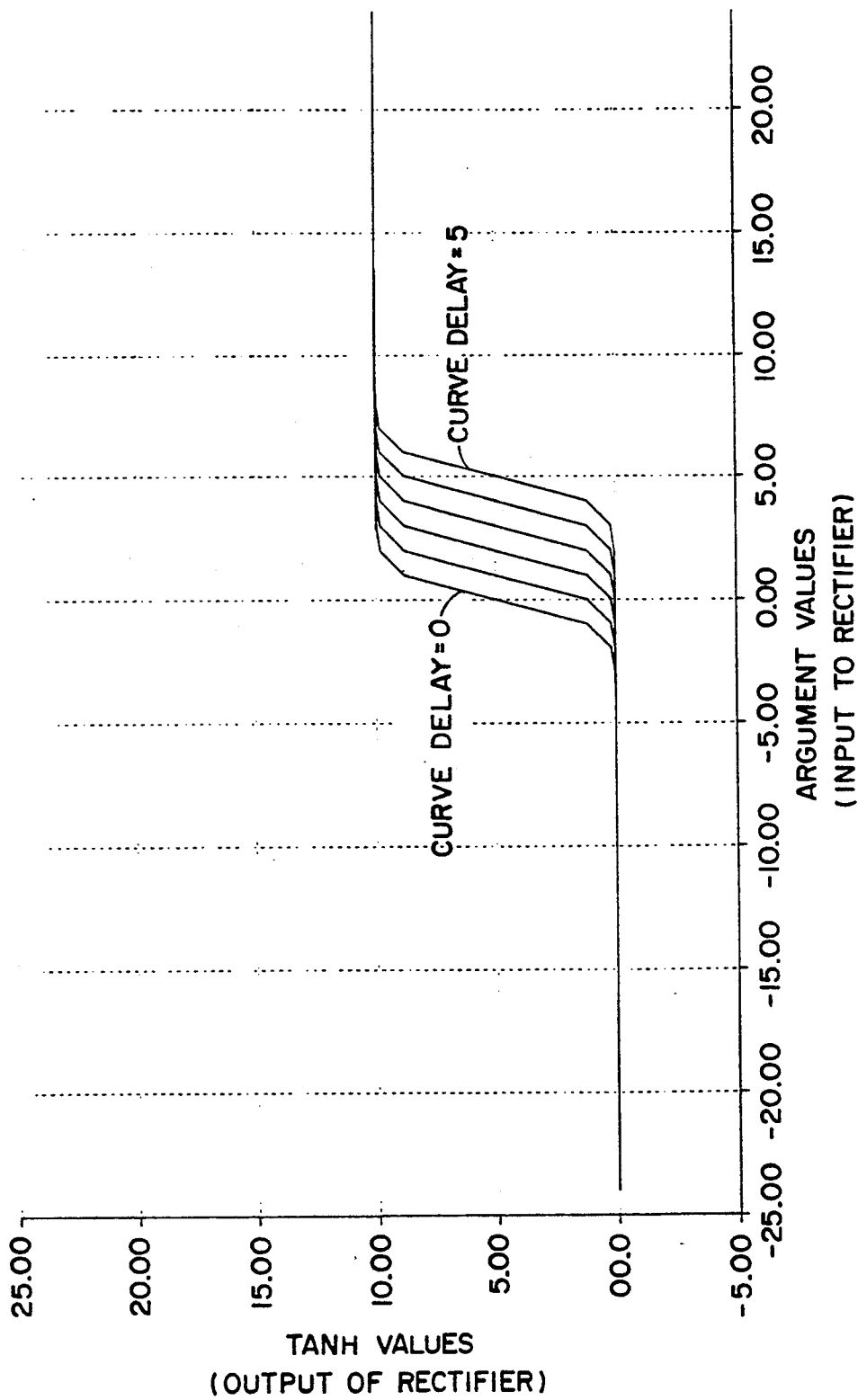

One technique to implement the asymmetric passband filters 31a–31hh is shown to include a combination of notch filters and resonator filters. As shown, each of the bandpass filters 31a–31hh are, as indicated above, comprised of a notch filter 32a–32hh cascaded with a resonator 34a–34hh. Each one of the notch filters 32a–32hh have a filter transfer function which is characterized as having a complex zero (FIG. 2A) with a center frequency slightly higher than a corresponding center frequency of the associated resonator 34. Since the response of the complex zero filter exhibits a non-flat response at frequencies removed from the notch frequency, a complex pole is added (FIG. 2B) to the notch filter at the same frequency as the notch but at a slightly different radial distance from the notch (as illustrated in FIG. 2A). This characteristic can be graphically depicted as shown in FIGS. 2A and 2B where the actual values of the zero root ($R_z$) and the pole root ($R_p$) are related to the location in frequency of the notch center frequency. Values of the pole root which are too close to the zero root can reduce the desired steep gradient characteristic of the filter. Ideally, values of these roots are obtained by computer simulation. Different values of $R_p$ are chosen depending upon the resonant or center frequency of the filter response desired to be obtained. The transfer function of the notch can be expressed as:

$$G(z) = \frac{B_2 z^2 + B_1 z + B_0}{C_2 z^2 + C_1 z + C_0} \quad \text{Equation 1}$$

Each of the resonators 34a-34h have a transfer function which may be expressed as $$H(z) = \frac{1}{A_2 z^2 + A_1 z + A_0} \quad \text{Equation 2}$$

where the coefficient $A_1$ represents the effective damping of the transfer function. When $A_1 = 2\sqrt{A_2 A_0}$ the roots of H(z) are equal and $A_1$ represents the critical value of damping. The damping ratio of Equation 2 is defined as the ratio of the effective damping to the critical value of damping. When $\delta$ is less than unity, the roots are complex and the response is said to be underdamped. When $\delta$ takes on a value of 0.707 or less the frequency response of Equation 1 exhibits a peak at a frequency other than DC which is a feature which permits the simple configuration described in Equation 1 above to act as a bandpass filter. Thus, when this filter arrangement is cascaded with a notch filter having a center or notch frequency slightly higher in frequency than the corresponding center frequency of the resonator, a filter exhibiting a relatively sharp gradient or roll off at the high frequency end of the filter is provided.

The transfer function of each of the bandpass filters 31a-31h of the filter bank can be expressed as in Equation 3.

$$H(z) = \frac{S}{A_2 z^2 + A_1 z + A_0} \cdot \frac{B_2 z^2 + B_1 z + B_0}{C_2 z^2 + C_1 z + C_0} \quad \text{Equation 3}$$

The S term appearing in the numerator of the resonator is a scaling factor chosen so that the response of the bandpass filter is unity at the resonant or bandpass center frequency.

Since the bandpass filter arrangement described above is used to provide adequate frequency discrimination, the selection of resonator frequencies and notch frequencies is important. The resonant frequencies are selected by dividing the amount of time required to hyperbolically frequency modulate the waveform to sweep over one octave. Illustratively a transmitted signal could be used to sweep over an octave from 3818.18 hertz to 1909.9 hertz. This sweep is divided into n segments where n is the desired number of bandpass filters per octave here corresponding to eleven of such filter sections 30a-30hh per octave. The frequency of the hyperbolically frequency modulated waveform at each of the instances of time is used to determine the resonator frequencies. Since the total time swept is divided linearly and the sweep is a hyperbolic frequency modulation, the resulting frequencies are hyperbolically spaced. This modulation technique is often referred to as linear period modulation, logarithmic phase modulation, or hyperbolic frequency modulation and is further discussed in a paper entitled "Pulse Compressor by Means of Linear-Period Modulation" by J. Kroszczynski, Proc. IEEE, Vol. 57, No. 7, July 1969, pp. 1260-1266.

Accordingly, the resonators 34a-34h each have center frequencies located at frequencies corresponding to F1, F2, F3, ..., Fn, whereas the corresponding notches have center frequencies which are located at frequencies corresponding to F2, F3, F4, ..., Fn+1. For example, if a resonator 34b has a center frequency at a frequency F2, the corresponding notch filter 31b has its notch frequency at the next higher resonator frequency F3. As indicated above, the individual bandpass filters are combined to provide a suitable filter bank 30 by serially cascading each of the notch filters 32a-32h and providing taps or outputs between common adjacent filters for coupling to the corresponding resonators 34a-34b with the last one of the notch filters 32h feeding a signal to the corresponding last one of the resonators 34h. Furthermore, the bandpass filters are arranged such that the bank is serial arranged from the highest notch frequency to the lowest notch frequency. That is, the first notch filter 32a has notch filter frequency disposed at the highest center frequency of the filter bank 30 with notch filter 32hh having a center frequency disposed at the lowest center frequency of the filter bank 30. Hence a signal input from buffer memory 26 (FIG. 1) provides a plurality of outputs at the taps along the string of serially cascaded notch filters 32a-32hh. Furthermore, the signal as it is cascaded through each of the notches 32a-32hh has the higher frequency resonator signals attenuated as the signal passes through the notches into successively lower frequency notches.

The bandpass filter bank 30 thus separates the input signal into a plurality of individual frequency components corresponding to components of the transmitted signal. This permits easier detection of the frequency components in the received signal.

The following analysis can be used to calculate the center frequencies of each of the filter channels 31a-31hh. The time period covered by each filter channel can be given by $T(f) = T_0 + \beta t$ where T(f) is the period of the sweep for the channel as a function of f the resonant frequency; $T_0$ is the initial period; and t is time.

Solving for $\beta$ provides:

$$\beta = (T(f) - T_0)/t$$

If the sweep will be from $f_2$ to $f_1$, then we set $T_0$ the initial period to $1/f_2$ and $T_{end}$ to $1/f_1$
when $t = 0$ $$T_f = T_0 = 1/f_2$$

An integer number of here 11 banks per octave is assumed spread over the interval $1/f_2$ to $1/f_1$.

Thus $1/f_1 - 1/f_2 = n = n$ samples at $f_3$. The number of integer samples n can be increased arbitrarily by some factor M to provide a higher number of samples in each filter channel thus the number of samples can be Mn or Mn samples at $f_3$. By increasing the number of samples by 100 effectively, the sampling rate of the A/D converter has been increased.

Thus $t = Mn/f_3$. When $t = Mn/f_3$ (i.e. the end of the sweep), $T(f) = 1/f_2$, and $\beta$ can be solved for by:

$$\beta = \left(\frac{1}{f_2} - \frac{1}{f_1}\right) / \frac{Mn}{f_3}$$

As an illustrative example, assume that bank 30 covers three octaves with n = 11 filter channels per octave and assume that M the factor to increase the samples in the channels is M = 100. Assume further a carrier frequency at 42,000 Hz.

$\beta = (T(f) - T_0)/t$ or $$\beta = \left(\frac{1}{f_2} - \frac{1}{f_1}\right) / \frac{Mn}{f_2}$$

Octave 1: 3818.18 to 1909.09 Hz.

$$\beta = \left(\frac{1}{1909.09} - \frac{1}{3818.18}\right) / \frac{(100)(11)}{42,000}$$

Octave 2: 1909.09 to 954.54

$$\beta = \left(\frac{1}{954.54} - \frac{1}{1909.09}\right) / \frac{(100)(11)}{42,000}$$

Octave 3: 954.54 to 477.27

$$\beta = \left(\frac{1}{477.27} - \frac{1}{954.54}\right) / \frac{(100)(11)}{42,000}$$

if we define HFMarg $= 2 \frac{\pi}{\beta} \ln \left(1 + \frac{\beta}{T_0} t\right)$ $\text{freq} = \frac{1}{2\pi} \frac{d_{arg}}{dt} = \frac{1}{\beta} \frac{\beta/T_0}{1 + \frac{\beta}{T_0} t}$ $\frac{1/T_0}{1 + \frac{\beta}{T_0} t}$ or $\frac{f_0}{1 + \beta f_0 t}$ Alternatively we can solve for t to find the time t when each frequency (f) is reached.

$\frac{1}{T_0} = f + \frac{f\beta}{T_0 t}$ $t = \frac{T_0}{f\beta} \left(\frac{1}{T_0} - f\right)$; thus $t = \frac{T_0}{f\beta} (f_2 - f_1)$ for Octave 1

$T_0 = \frac{1}{f_2} = \frac{1}{3818.}$ $\beta = \left(\frac{1}{1909.09} - \frac{1}{3818.18}\right) / \frac{42,000}{1,100}$ $\beta = 0.01$ $\frac{T_0}{\beta} = \frac{\frac{1}{3818.09}}{\left(\frac{1}{1909.09} - \frac{1}{3818.18}\right)} / \frac{42,000}{1,100}$ $\frac{T_0}{\beta} = .026190488$ Thus, the hyperbolically spaced resonant frequencies f occurring at a time t having expanded samples Mn is given by:

$t = \frac{.026190488}{f} (3818.18 - f)$

| f | t | N |
|---|---|---|
| 3818.18 | 0 | |
| 3500 | .002380939 | 99.999 |
| 3230.77 | .004761884 | 199.999 |
| 3000 | .007142844 | 299.999 |
| 2800 | .009523797 | 399.999 |
| 2625 | . | . |
| 2470.59 | . | . |
| 2333.33 | . | . |
| 2210.53 | . | . |
| 2100 | . | . |
| 1909.09 | .026190488 | 1,100.00 | using $f = \frac{f_0}{1 + \beta f_0 t}$ if we let $f_0 = \begin{cases} 954.54 \\ 1909.09 \\ 3818.18 \end{cases}$ and $f = \begin{cases} 477.25 \\ 954.54 \\ 1909.09 \end{cases}$ knowing $\beta$ we find t=0.026190488.

Above it was assumed that each octave is divided over eleven filter channels thus, the time $t_f$ in each filter is:

$t_f = \frac{t}{11} = \frac{.026190488}{11} = .002380953$

Thus, using $$f = \frac{f_0}{1 + \beta f_0 t}$$

where t=0, n(0.002380951)

The resonant frequency of the filter bank 30 and the frequencies, samples per cycle, number (#) of samples, and number (#) of cycles of the transmitted waveform are set forth below as Table II.

TABLE II

| f | Samples/cycle | # Samples | # Cycles | Bank No. |
|---|---|---|---|---|
| 3818.18 | 2.75 | 110 | 40 | 1 |
| 3500 | 3 | 108 | 36 | 2 |
| 3230.77 | 3.25 | 104 | 32 | 3 |
| 3000 | 3.5 | 112 | 32 | 4 |
| 2800 | 3.75 | 105 | 28 | 5 |
| 2625 | 4 | 112 | 28 | 6 |
| 2470.59 | 4.25 | 102 | 24 | 7 |
| 2333.33 | 4.5 | 108 | 24 | 8 |
| 2210.53 | 4.75 | 114 | 24 | 9 |
| 2100.0 | 5 | 100 | 20 | 10 |
| 2000.0 | 5.25 | 105 | 20 | 11 |
| 1909.09 | 5.5 | 110 | 20 | 12 |
| 1909.09 | 5.5 | 110 | 20 | 12 |
| 1750 | 6 | 108 | 18 | 13 |
| 1615.38 | 6.5 | 104 | 16 | 14 |
| 1500 | 7 | 112 | 16 | 15 |
| 1400 | 7.5 | 105 | 14 | 16 |
| 1312.5 | 8 | 112 | 14 | 17 |
| 1235.29 | 8.5 | 102 | 12 | 18 |
| 1166.67 | 9 | 108 | 12 | 19 |
| 1105.26 | 9.5 | 114 | 12 | 20 |
| 1050 | 10 | 100 | 10 | 21 |
| 1000 | 10.5 | 105 | 10 | 22 |
| 954.54 | 11 | 110 | 10 | 23 |
| 875 | 12 | 108 | 9 | 24 |
| 807.69 | 13 | 104 | 8 | 25 |
| 750 | 14 | 112 | 8 | 26 |
| 700 | 15 | 105 | 7 | 27 |
| 656.25 | 16 | 112 | 7 | 28 |
| 617.65 | 17 | 102 | 6 | 29 |
| 583.33 | 18 | 108 | 6 | 30 |

TABLE II-continued

| f | Samples/cycle | # Samples | # Cycles | Bank No. |
|---|---|---|---|---|
| 552.63 | 19 | 114 | 6 | 31 |
| 525 | 20 | 100 | 5 | 32 |
| 500 | 21 | 105 | 5 | 33 |
| 477.25 | 22 | 110 | 5 | 34 |

To relate $\beta$ to the HFM parameters F, K $$HFarg = \frac{F}{k} \ln(1 + kt)$$

$$freq = \frac{d_{arg}}{dt} = \frac{F}{1 + kt}$$

when t=0, freq=F which is FS however FS=also equals $1/T_0$, and $$arg = \frac{\frac{1}{T_0}}{K} \ln(1 + kt)$$

$$freq = \frac{\frac{1}{T_0}}{(1 + kt)}$$

$$t = \frac{n}{SR} \quad freq = F_2$$

$$Fe = \frac{\frac{1}{T_0}}{1 + k\frac{n}{SR}}$$

$$\beta = \left(\frac{1}{f_2} - \frac{1}{f_1}\right)\frac{SR}{n}$$

$$\frac{1}{T_0} = Fe + Fe^{kN/SR}$$

$$F_s = Fe + Fe^{kN/SR}$$

$$F_s - Fe = Fe^{kN/SR} \div F_s Fe \text{ both sides}$$

$$\frac{F_s - Fe}{F_s \cdot Fe} = \frac{F_c h}{F_s \cdot F_c} \frac{N}{SR}$$

and multiply both sides by $\frac{SR}{N}$ $$\left(\frac{SR}{N}\right)\frac{F_s - Fe}{F_s \cdot Fe} = \left(\frac{SR}{N}\right)\left(\frac{F_s - F_c}{F_s \cdot F_c}\right) = \frac{h}{FS}$$

let $\beta = \frac{h}{FS}$ $$h = \beta F_s = \frac{\beta}{T_0}$$

$$\text{any} = \frac{\frac{1}{T_0}}{\frac{\beta}{T_0}} \ln\left(1 + \frac{\beta}{T_0} t\right) = \frac{1}{62} \ln\left(1 + \frac{\beta}{T_0} t\right)$$

To provide coherence, the output signals from each of the channels should be in phase. This may be provided by calculating the filter phase response at the resonant or center frequency and correcting the filter outputs by removing entirely the effects of phase.

One technique for correcting for phase may be provided by collecting samples of output data, reversing the order in time of the samples, and refiltering the data. For this method the filter is designed to exhibit one half of the desired response. However, due to the number of channels involved and the amount of data involved, computational time for this technique may be excessive for certain applications. A second technique to calculate the filter response is to subtract the arc tangent of the denominator from the arc tangent of the numerator of the particular transfer function. Since the particular implementation used to provide the filter bank, i.e. the lowest order passband, is a cascaded through 33 stages, the filter coefficients are less than one. The cascading generates extremely low filter values or filter coefficients which may reduce the accuracy of the above are tangent technique of correcting for phase response.

Accordingly, a third technique to calculate phase correction is used. A sine and cosine sequence at a selected resonant or center frequency are provided and passed through the filters. The inputs are used to form an equation of the form $$X_M = e^{-jFM} \quad \text{Equation 4}$$

where the output stage of the filter is used to provide equation $$Y_M = e^{-j(FM + \phi M)} \quad \text{Equation 5}$$

with $\phi_M$ being the unknown phase shift of filter stage M. The sequence $X_M$ and $Y_M$ are multiplied resulting in a phase only sequence of $e^{\phi M}$. Arc tangents are calculated for each point in the sequence and the average value of arc tangent is provided. Phase correction can occur either within the filters or in processing occurring after the processing shown in FIG. 2. The latter technique is here preferred.

The filtered signals from bank 30 are fed to respective interpolators 36a-36hh. Each interpolator 34a-34hh provides phase correction to filtered channels to align the channels in phase and provides a sinusoidal interpolation of the filter data for sample rate enhancement. The interpolation algorithm implemented in the interpolators 36a-36h for a given channel M is given below.

$$Y_2 = A_2 \sin(2\pi F_M T' + \phi_M) + A_1 \cos(2\pi F_M T' + \phi_M) \quad \text{Equation 6}$$

where $A_2$ is given by:

$$A_2 = (Z_{M,n+1} - X_{M,n})\frac{\cos(2\pi F_M T)}{\sin(2\pi F_M T)}$$

and $A_1$ is given by:

$$A_1 = X_{M,n}$$

and where $X_{M,n}$ is the nth output sample of filter channel m;

$\phi_m$ is a phase correction for filter channel m;
$Y_L$ is the interpolated output sample;
T is equal to the sample period; and
T' is equal to the sample period at the higher or enhanced sampling rate which could vary between a factor of 1.0
(corresponding to T) up to and higher than a factor of T/4.

In general T'=T/N where N is an integer.

The interpolated data from interpolators 36a-36hh are fed to one of a plurality of nonlinear dynamic range compression circuits 40a-40hh of the dynamic range compression block 40. Each of the individual circuits 40a-40hh includes a cascade of two automatic gain control circuits here 42a', 42a" shown for stage 40a cascaded with a half wave rectifier circuit 49a. Each of the gain control circuits 40a-40hh are here substantially identical but for differences in input frequencies and further that gain control circuit 42a' implements short adaptation rates and gain control circuit 42a" implements long adaptation rates. In particular, referring to bank 40a, as illustrative of the other banks 40b-40hh, it is seen that bank 40a includes a first stage 42a and a second stage 44a. Stage 40a includes a buffer memory 41 which provides a buffer or delay of $m_1$ samples of data. The delayed data is fed to a divider 43 and undelayed data is fed to a first summer 44 which provides a sum of samples of said data. If the number of samples of said data summed is less than the number of samples $m_1$ then the average value of the data $\bar{X}_n$ is given by Equation 7 below. That is, $X_n$ is divided in divider 43 by THR1. THR1 is an average period of time of a short duration over which the data $X_n$ is averaged to obtain an estimate of the background noise in $X_n$ at a short adaptation rate.

If the number of samples of m is equal to or greater than $m_1$ then the number of samples is given by Equation 8 below. That is, the sum $\Sigma |x_n|$ is scaled by $M_1^{-1}$ and the threshold adaptation rate THR1 is added to the scaled sum to provide an estimate of the background noise over the sequence $X_n$ for a short adaptation rate. A similar arrangement is provided for channel 42' for $M_2$ samples over a longer adaptation rate THR2. Thus, AGC 42 includes a buffer 41, summer 44', 46', multiplier 45', and divider 43' similar to that described above for AGC circuit 42.

Thus, a similar arrangement is also provided at the second stage using the second threshold $THR_2$ corresponding to a long adaptation rate on the average value of data $\bar{X}_n$. The value $X_n$ is given in accordance with the number of samples n relative to the number of samples $M_2$ in accordance with Equations 9 and 10.

$$n < M1 \; \bar{X}_n = \frac{\bar{X}_n}{THR_1} \quad \text{Equation 7}$$

$$n \geq M1 \; \bar{X}_n = \frac{\bar{X}_n}{THR_1 + \frac{1}{M1} \sum_{n+1-M1}^{n} |X_n|} \quad \text{Equation 8}$$

$$n < M2 \; \bar{X}_n = \frac{\bar{X}_n}{THR_2} \quad \text{Equation 9}$$

$$n \geq M2 \; X_n = \frac{X_n}{THR_2 + \frac{1}{M2} \sum_{n+1-M2}^{n} |\bar{X}_n|} \quad \text{Equation 10}$$

where
- $M_1$ = INT TIME 1 (sec)*$\overline{FS}$ (enhanced sample rate (T')) and
- $M_2$ = INT TIME 2 (sec)*$\overline{FS}$ (enhanced sample rate (T'))

Thus in order to obtain an estimate of background noise, the filtered output from each of the banks 30a-30hh are scaled by the average value of the data over short (THR1) and long (THR2) adaptation rates.

Each of said scaled channel signals from the AGC circuit is fed a half wave rectifier 49a-49hh respectively as mentioned above. Here the algorithm is illustrated graphically in FIG. 2C. The x-axis values represent an input level to the rectifier with the y-axis values representing the corresponding output level from the rectifier. For the present discussion a saturation level of 10 and a delay value of 1.27 was used.

The outputs from each of the range compressors 40a-40hh are then fed to the coincident detector circuit 50.

Figure 3:
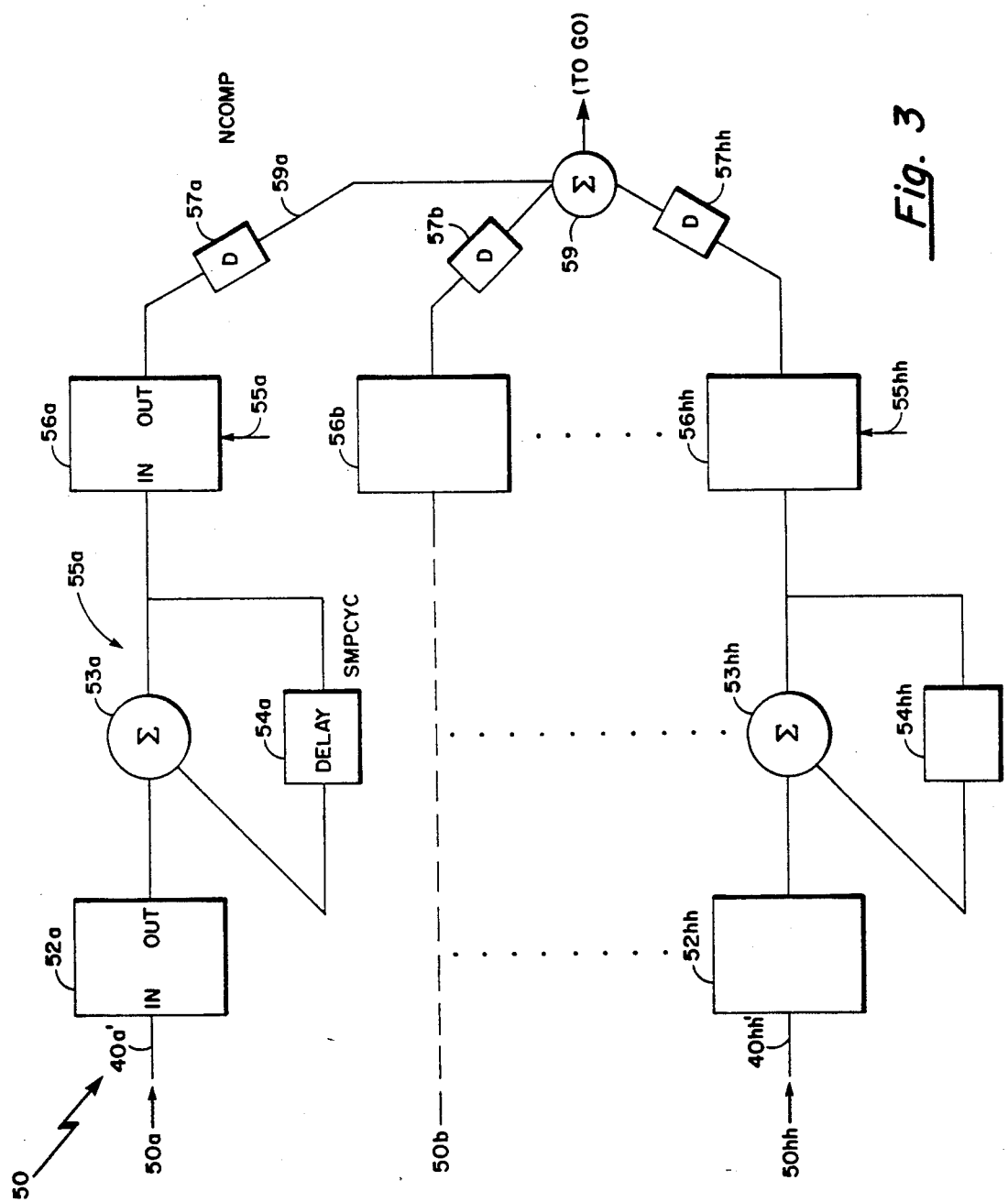
FIG. 3 is a block diagram of a coincident detector circuit useful for the system shown in FIG. 1.

Referring now to FIG. 3, a coincident detector 50 is shown fed by each of the channels of the outputs 40a'-40h' of the nonlinear compression circuits 40a-40h. The coincident detector circuit 50 is shown to include a plurality of channels 50a-50hh corresponding to the number of channels provided in filter bank 30, here 34 channels. With channel 50a being representative of all the channels, coincident detector is shown to include a first memory or buffer device 52 having an input and an output with the input being fed signals provided from the output of the half wave rectifier 49a of channel 40 via a line 40a and with the output being fed to a summer 53a. Summer 53a is disposed in a loop with a delay element 54a (i.e. a register or memory). Delay element 54a provides a delay corresponding to the number of samples per cycle. Within loop 55a is provided a sum of the coincident components of the signals provided in channel 50a with the output of said sum being fed to a second output memory 56a having input and output ports, as shown. Channel 50a is thus used to integrate the corresponding coherent components of the signals fed to channel 50a. Since the location in time of the coherent components of the signal filtered through bank 50a is known as a result of the hyperbolically frequency modulated transmitted pulse, these coherent signal components can be integrated within the channel to reinforce the coherent components of the signals in each of said channels 50a-50hh. Thus in memories 56a-56hh are provided signals representing the integrated coherent components of signals in the respective channels 50a-50hh. That is, the integration of the signals within said channels reinforces coherent components of signals within said channels. The outputs of memories 56a-56hh is fed to corresponding ones of second delay elements 57a-57hh, as shown. Here delay elements 57a-57hh each provide a delay corresponding to the channel to channel delay and thus provide a first output to a delay element 57a.

Correspondingly, each of the remaining channels 50b-50hh have a similar arrangement of elements, as shown illustratively for channel 50hh, and which correspondingly provide integrated coherent components of the signals fed from the respective non-linear range compression circuits 40b-40hh. Correspondingly, at the output of each of said buffer memories 56b-56hh are fed to one of a remaining plurality of delay elements 57b-57hh to delay the signals in accordance with the required channel to channel delay which is related to the temporal spacing of the portions of the transmitted waveform as tabulated in Table II. The outputs of the delays 57a-57hh are fed to a summer 59 to provide a coincident, coherent output signal which is fed to a user device 60 as shown in FIG. 1. The summer 59 adds in phase the coherent components of the signals from each of the banks 50a-50hh. That is, the summer 59 integrates the signals across each of the channels 50a-50hh. Thus, the coincident detector 50 integrates the coherent components from each of the bandpass filters within each of the channels 50a-50hh and further integrates the coherent components of such signals across the channels 50a-50hh within summer 59.

The delay elements 57a–57hh have a selected delay in accordance with the required channel to channel delay mentioned above to permit the signals in each channel to be integrated in phase and thus provide a composite output signal.

Figure 3A:
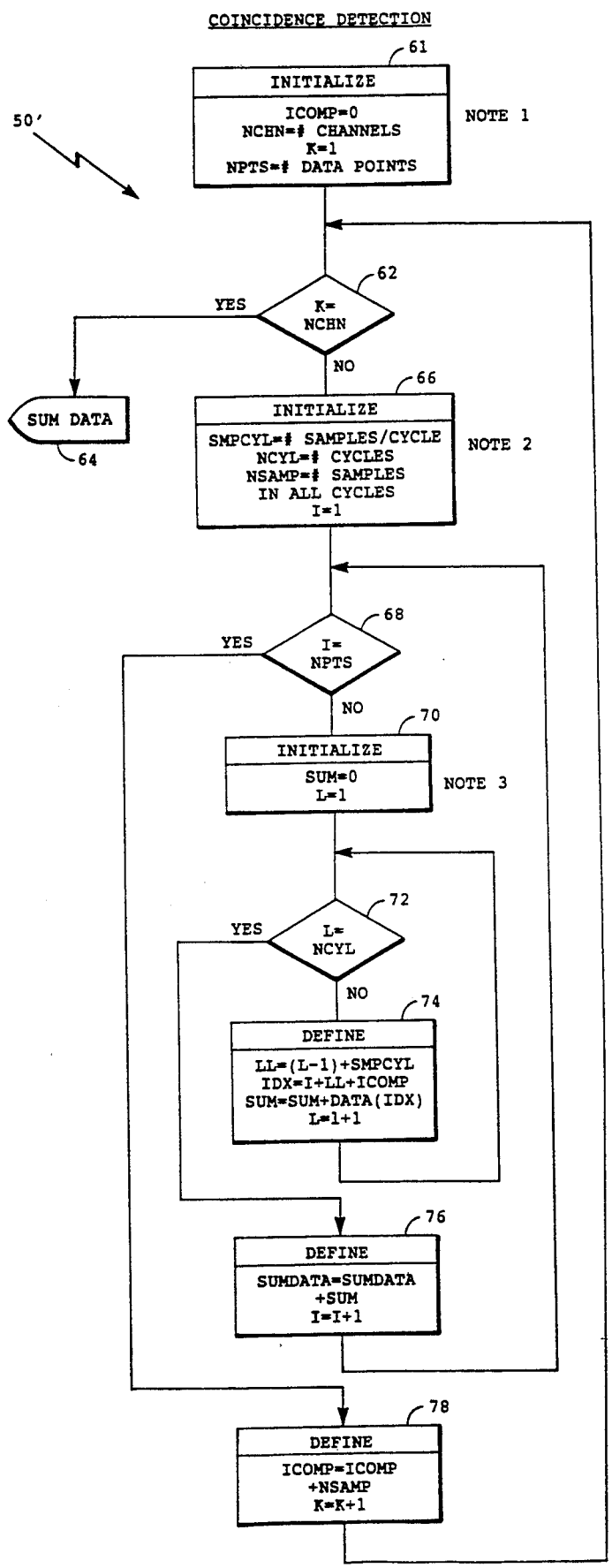
FIG. 3A is a flow chart showing steps in implementing coherent detection in accordance with a further aspect of the present invention.
Figure 4A:
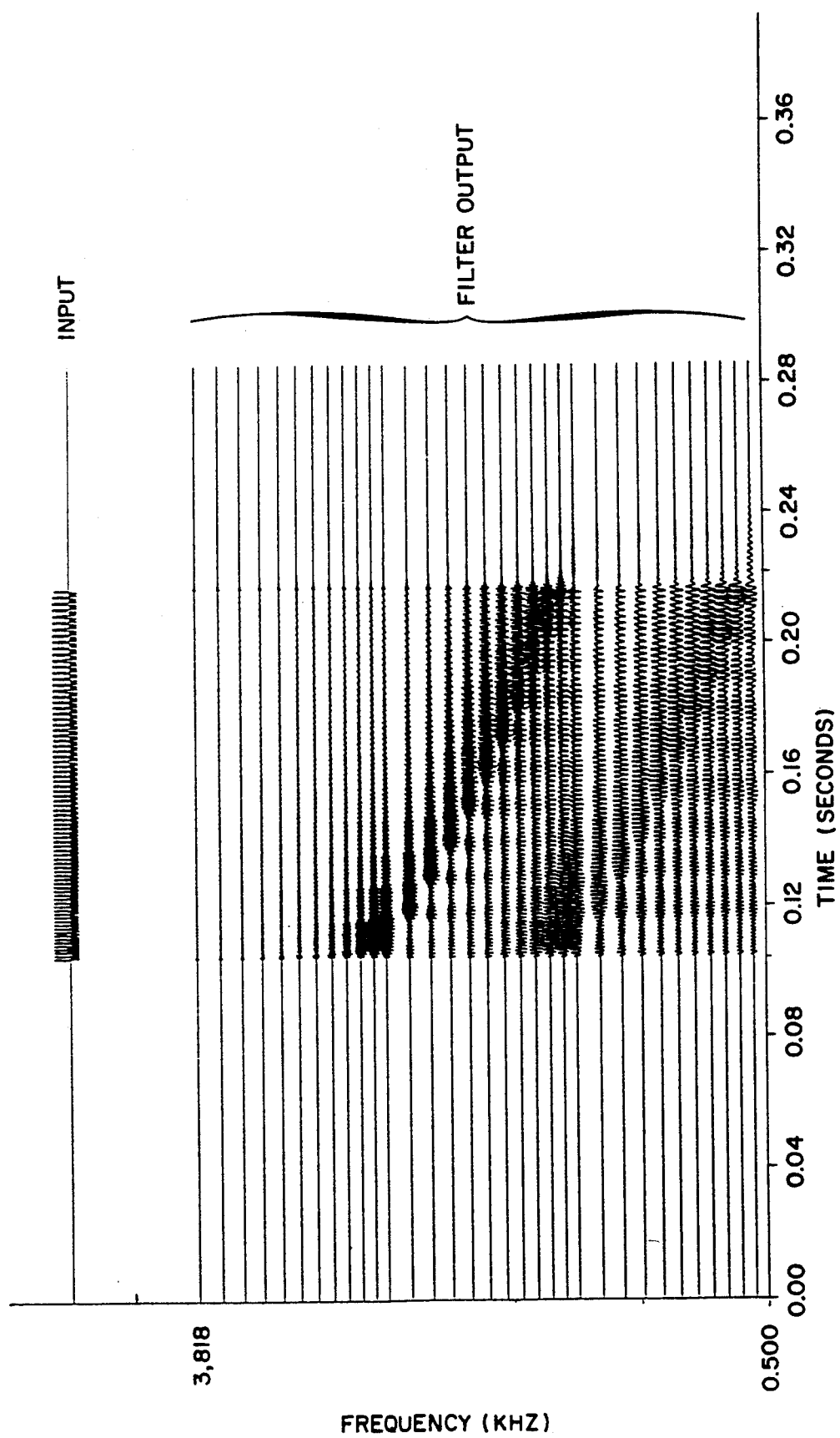
FIG. 4A is a plot of amplitude vs. frequency for portion of a transmitted signal and decomposition of the transmitted signal provided by the bandpass filter bank of the present invention.
Figure 4B:
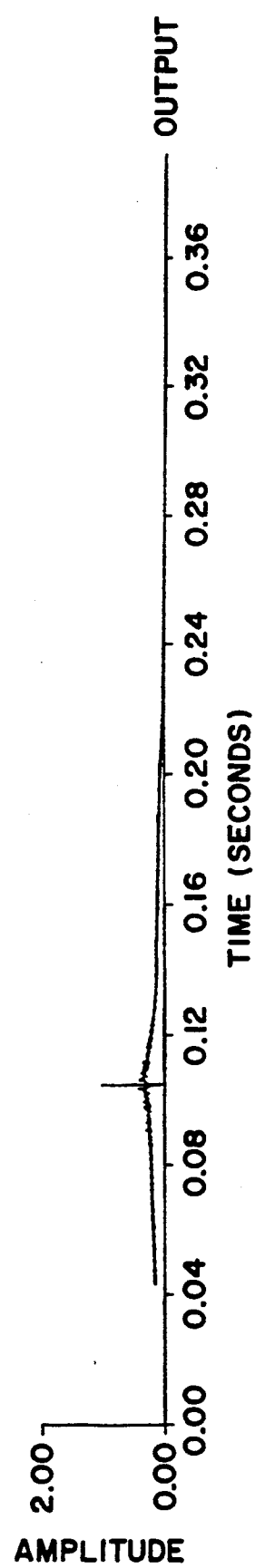
FIG. 4B is a plot of amplitude vs. frequency of an output of the processor from the coincident detector in response to the decomposed transmitted signal.

Referring now to FIG. 3A, an algorithm 50' to implement coincident detection is shown to include a first step 61 in which indices ICOMP, NCHN, K, and NPTS are all initialized. ICOMP is initialized to zero and corresponds to the channel to channel delay; NCHN is initialized to the number of channels in the filter here 34; K is initialized to one; and NPTS is initialized to the number of data points within each channel here corresponding to 3000 points per channel.

After the initialization step 61, the value of the index K is tested to see if it is equal to NCHN, the number of channels. If K is not equal to NCHN, control is transferred to a second initialization sequence.

In this second initialization sequence 66 variable SMPCYC is set to the number of samples per cycle, NCYC is set to the number of cycles for each segment of the transmitted waveform, and NSAMP is set to the number of samples for all cycles, and I is set equal to one.

Control is transferred to a second testing step 68 in which the value of I is tested to determine if I is equal to the number of points NPTS here equal to 3000. If I is not equal to the number of points, then control is transferred to a third initialization step 70 and variable "sum" is set equal to zero and a variable l is set equal to one. Thereafter, control is transferred to a third test step 72 to test the value of l to determine if l is equal to NCYC. If l is not equal to NCYC, the control is transferred to a step 74 in which the values of LL are given by the equation $LL=(l-1)SMPCYC$; $IDX=I+L-L+ICOMP$; and $SUM=SUM+DATA(IDX)$; and $l=l+1$. At step 74, the data is summed within each channel and across each channel. Alternatively, the algorithm could be constructed to integrate the signal within each channel and then integrate the signals across the channels. At the end of the defined sequence step 74, control is returned to step 72 in which the value of l is again tested. As indicated in step 74, the value of l is incremented by one each time step 74 is executed. When the value of l equals NCYC, control is transferred from step 72 to step 76. Until l equals NCYC, however, control is transferred back to step 74. At step 76, the calculated SUM is stored in an array called SUM DATA index I is incremented by 1. Control is then transferred back to step 68 and the value of I is tested to see if I equals the total number of points. If I equals the total number of points NPTS, then control is transferred from step 68 to step 78, otherwise control is transferred back to step 70 and the sequence of steps 70 is again performed. Thereafter the sequence of step 72 and 74 are executed until L=NCYC and control is transferred out of the sequence to the step 76 to provide sum stored in array SUM DATA and to increment I by 1. Control is transferred out of this sequence only when I is NPTS (i.e. when the entire channel has been summed). When I is NPTS, step 68 transfers control to step 78 in which ICOMP=ICOMP+NSAMP, to provide the channel to channel delay and K is incremented and control is transferred back up to step 62 to repeat the process as described above. This occurs until K=NCHN and control is transferred from step 62 to step 64, storing the data in SUM DATA. SUM DATA array now contains data corresponding to the original 34 channels of data compressed within each channel and across all of said channels. That is, it is seen that the coincidence detection algorithm 50' has three nested loops with index l being incremented a plurality of times for each time index I is incremented and index I being incremented a plurality of times for each time index K is incremented.

Referring now to FIGS. 5A–5F, plots of amplitude vs. delay in milliseconds is shown for processed echo information from a simulated target using a simulated transmitted waveform having a frequency bandwidth of two octaves (1909.09 to 477.25) and having the frequencies, the number of cycles at each frequency, and the number of samples in each cycle as set forth in Table II. This particular set of characteristics is illustrative only and other sets of parameters for a transmitted signal could, of course, be used and constructed in accordance with the techniques mentioned in conjunction with Table II.

Figures 5A, 5B, 5C:
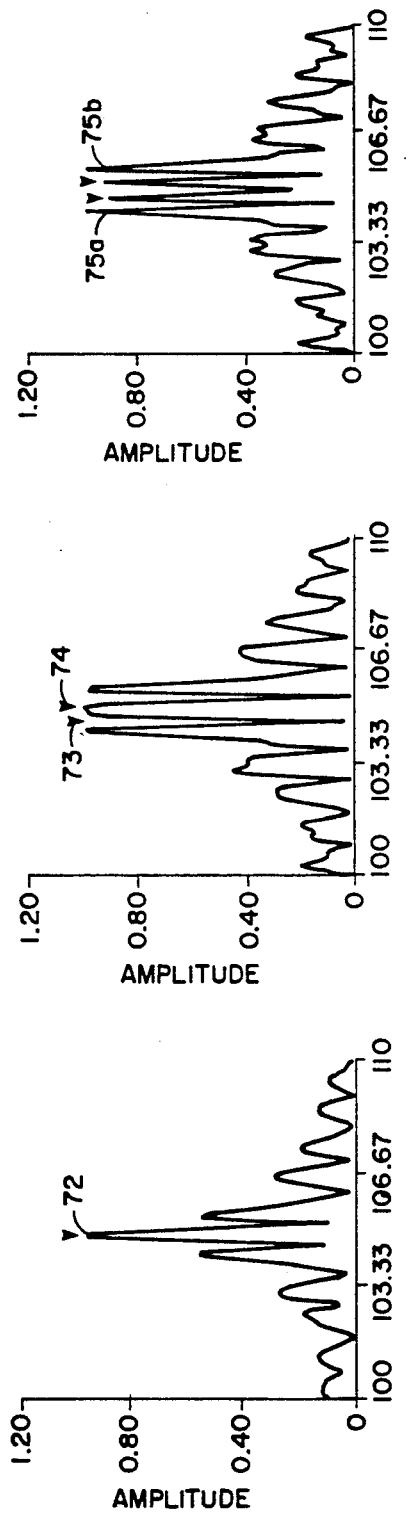
FIGS. 5A-5F are plots of amplitude (dB) versus delay (milliseconds) of highlights provided from echo returns having various sample separations processed in a conventional receiver employing match filtering.

For each of the plots in FIGS. 5A–5F, matched filter processing is employed to process the signal returns. The arrows over the peaks or highlights correspond to the locations where the processed highlight should detect a feature of an object. Each of FIGS. 5A–5C are provided by a pair of echo returns which are separated by a predetermined number of samples (i.e. separated in time to ascertain the efficiency of the processing technique to detect features of an object separated by a minimum distance as represented by a delay of i samples). This gives an indication of the resolution capability of the technique to resolve minimal features of a target. Thus, in FIG. 5A, the first echo return and a second echo return (i.e. the same data delayed by i=three samples) are processed using the matched filtering technique. As seen is FIG. 5A with a three sample separation, the match filtering technique provides a single highlight 72. Thus, the match filtering technique cannot resolve features of an object corresponding to the above echo return which are separated by a distance corresponding to three samples. FIG. 5B shows a corresponding plot of a pair of highlights having an i=four sample separation. The processed return indicates there are three peaks within the delay range of 103.33 to 106.67 milliseconds. Only two peaks should be observed thus one of the highlights is a false indication (or sideband) and furthermore the correct highlight as shown by arrow 73 is not present in the detected sample.

Referring now to FIG. 5C, a similar arrangement is provided using two echo returns having an i=five sample separation. After match filter processing of this echo return, four highlights are observed within the delay range of 103.33 to 106.67 milliseconds. Again, only two highlights should be observed. The highlights with the arrows disposed thereover correspond to the correct highlights, however, it is noted that their amplitude is lower than the amplitude of sidelobes 75a, 75b. Thus, also indicating poor resolving characteristics for match filtering technique having five sample separation.

Figures 5D, 5E, 5F:
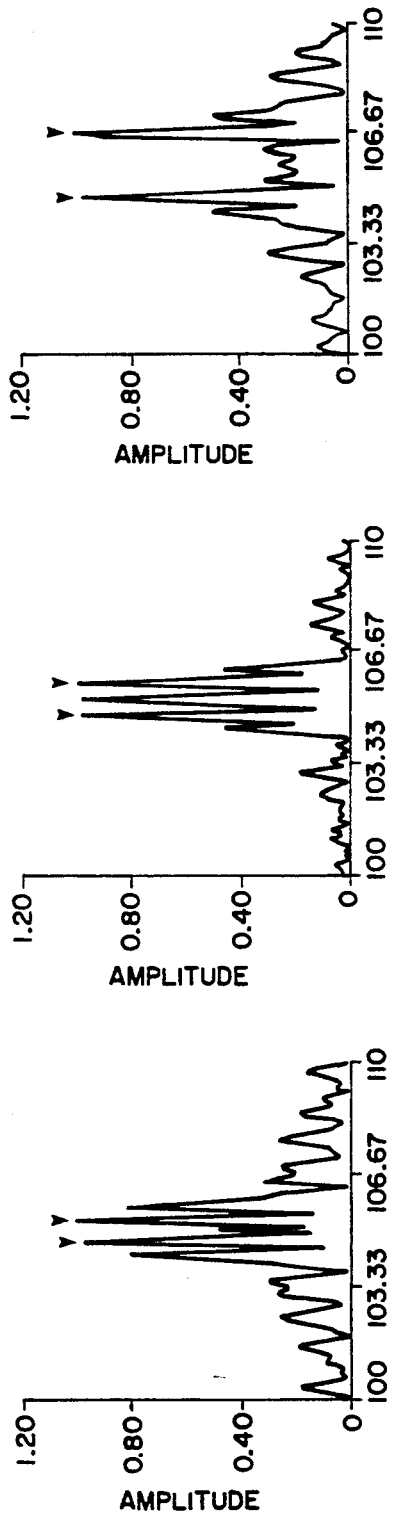

FIGS. 5D–5F show the characteristics of echo returns having i=six sample, i=ten sample, and i=twenty sample separation, respectively. As shown, the six sample delay processed by matched filtering techniques processes the returns correctly to provide the highlight indicated by the arrows at the proper positions. However, with ten sample separation, an additional highlight is provided within the pair of correct peaks and is not until a twenty sample separation that the correct highlights are provided with low sidelobes. Accordingly, the match filtering technique operating on the data described above is apparently capable of resolving, without ambiguities, the data having at least a twenty sample separation.

Figure 6A:
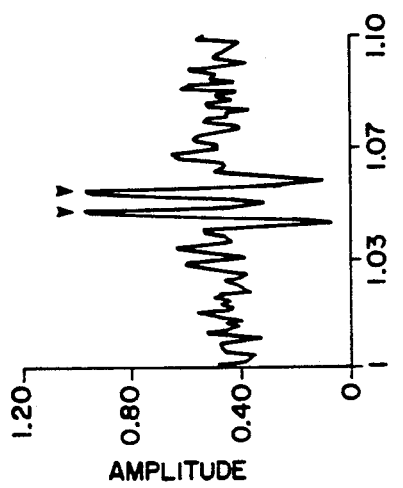
FIGS. 6A-6F are plots of amplitude (dB) versus delay (milliseconds) of highlights provided from echo returns having various sample separations in accordance with the filtering and coincident detection of the present invention.

Referring now to FIG. 6A, the same data representing the pair of echo returns having an i=three sample separation is processed using the filtering and coincident detection of the present invention. With the returns having a three sample separation, the technique described above is also unable to resolve differences between the returns.

Figure 6B:
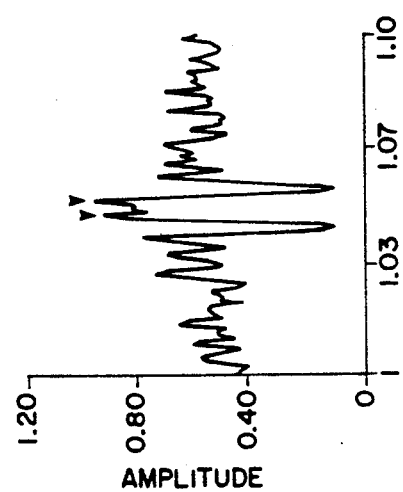
Figure 6C:
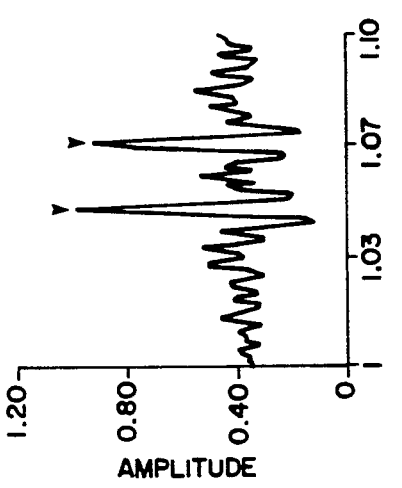
Figure 6D:
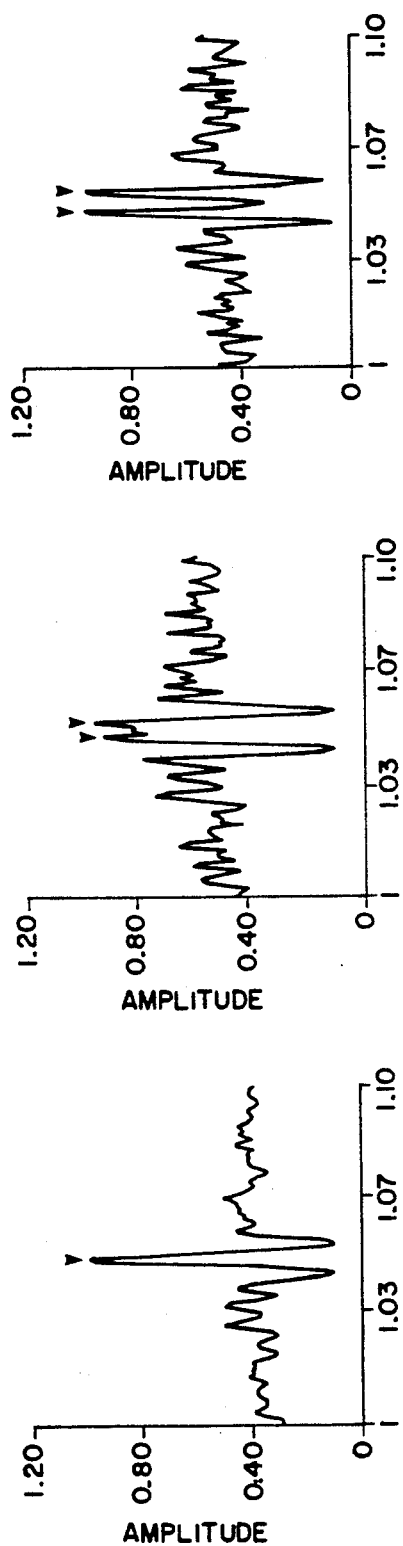
Figure 6E:
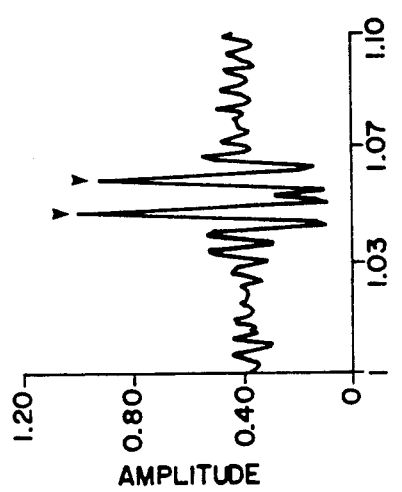
Figure 6F:
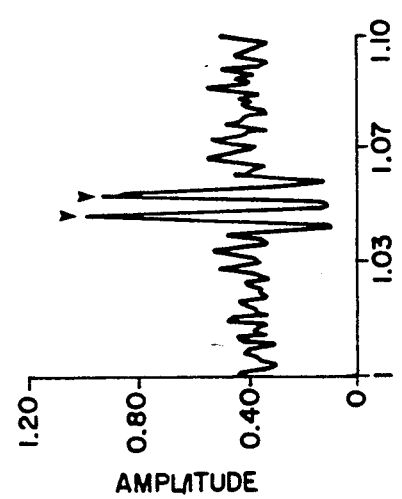

As shown in FIG. 6B, however, with the returns having an i=four sample separation, the technique described above is able to resolve differences in returns as illustrated by the two highlights with the arrows disposed thereover although sidelobes, as well as the amplitude level between the peaks are relatively high. However, at an i=five sample separation, the processing technique described above is clearly able to resolve the returns with low sidelobe levels and without ambiguous highlights. This is carried forth for the i=six sample, i=ten sample, and i=twenty sample separations as illustrated in FIG. 6D-6F. Accordingly, the processing technique described above is able to resolve finer, smaller targets unambiguously compared to the conventional match filtering technique.

Referring now to FIGS. 7A-7C, a pair of echo returns are processed using conventional match filtering technique to provide the response as shown in FIGS. 7A-7C. The first return has a first characteristic, whereas the second return has the first characteristic but with a relative amplitude of 1, 0.7, and 0.5 of the first return for FIGS. 7A-7C, respectively. Further, the second return is spaced from the first return by six samples. As shown in FIG. 7A, the first return is barely able to resolve the differences between the two signals. The correct highlights are denoted by the arrows disposed thereover. Since the sidelobes adjacent the correct highlights are higher than the correct highlights there is an ambiguity as to where the target is located. The relative amplitude of 0.7 as illustrated by the processed data in FIG. 7B shows that the second highlight is substantially below the sidelobes having a relative amplitude of about 0.4 as illustrated by the second arrow in FIG. 7B. FIG. 7C shows that the second highlight is virtually eliminated.

Referring to FIGS. 8A-8C, corresponding returns processed using the techniques in accordance with the present invention are illustrated. The technique is able to resolve relative amplitudes of 1 and 0.7 as illustrated in FIGS. 8A and 8B. At FIG. 8C, with the relative amplitude of 0.5 for the second highlight, the highlight is present although it is somewhat lower than one of the adjacent sidelobes although the adjacent sidelobe is spaced at approximately 20 milliseconds further from the anticipated second peak. Accordingly, FIGS. 7A-7C and 8A-8C are used to illustrate partially the effects of frequency attenuation on signal returns and show that for the technique, in accordance with the present invention, the processing is less sensitive to these attenuation effects than the conventional matched filtering approach.

Figure 10:
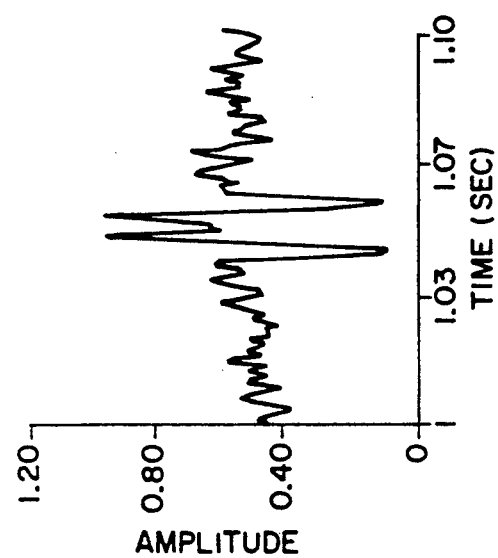
FIG. 10 is a plot of amplitude (dB) versus delay (milliseconds) of highlights from three echo returns of various sample separations processed using the filtering and coincident detection of the present invention.
Figure 9:
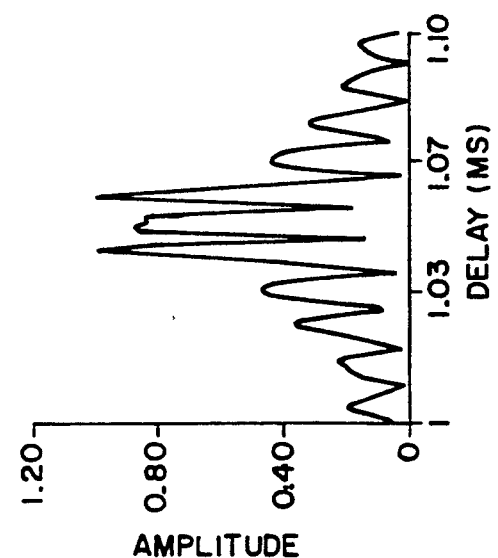
FIGS. 9 is a plot of amplitude (dB) versus delay (milliseconds) of highlights from three echo returns of various sample separations processed using the conventional match filter approach.

Referring now to FIGS. 9 and 10, a three-highlight scenario using original echo data and echo data which are delayed by i=three samples and i=six samples is shown processed in accordance with the conventional match filtering technique and the technique as described above. In FIG. 9, the match filtering technique, the return which should be indicated by highlights appearing at the arrows indicates that the target extent is distorted in that the match filtering technique cannot resolve either the three sample separation or the six sample separation. Moreover, the sidelobes appear as highlights adjacent the returns and confuse the extent of the target. However, as illustrated in FIG. 10, the extent of the target is clearly recognized by the two highlights appearing by the illustrated arrows. Although the three sample separation of the second highlight is not evident in the processed return of FIG. 10, clearly the extent of the target representing the six sample separation, as pointed out by the two arrows is evident and thus the extent of the target can be ascertained in the multi-highlight environment.

Figure 11:
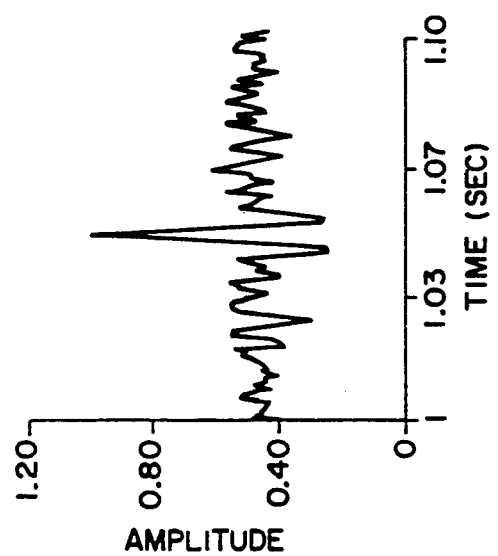
FIG. 11 is a plot of amplitude (dB) versus delay (milliseconds) showing the minimum signal to noise ratio for a sonar system in accordance with the present invention.

Referring now to FIG. 11, the target is detected as illustrated by a single highlight having a signal to noise ratio as low as −5.0 dB. This is in agreement with achievable performance based on the time-bandwidth product of the transmitted waveform.

The processing technique described above includes multi-channel processing which breaks up a return or echo signal into locally compact wavelets in the time frequency domain. These wavelets when added in phase result in significant enhancement and estimation of target parameters since the wavelets being added in phase permit reinforcement of coherent components of the signals being reflected from a potential target. The above approach can be implemented using especially designed digital signal processors or using software algorithms. In either event, either the digital processors or the software would implement the algorithms and the processors illustrated and described above. Further, although the processing has been illustrated using two octaves, obviously a higher number of octaves would be more beneficial to improve detection and recognition capabilities. However, the processing technique could also be provided using a single octave although with fewer advantages over the conventional match filtering technique. Further, although the technique has been particularly described in conjunction with sonar processing of acoustic signals, the technique is also applicable to processing of communication signals, as well as radar signals. In particular, the key elements of the technique is the transmission of wideband waveforms in conjunction with multi-channel processing and coincident detection of coherent components for the returned or received signal in each of the channels for the receiver.

Having described preferred embodiments of the invention, it will now become apparent to one of skill in the art that other embodiments incorporating their concepts may be used. It is felt, therefore, that these embodiments should not be limited to disclosed embodiments, but rather should be limited only by the spirit and scope of the appended claims.

What is claimed is:

1. A signal processor comprising:
   means for separating an incoming signal into a plurality of signals with each one of said plurality of signals occupying one of a corresponding plurality of channels with each channel having a predetermined passband characteristic; and
   detector means fed by each one of said plurality of signals for integrating coherent components of said plurality of signals, said detector means further comprising:

means for integrating coherent components of said signal within each one of said passbands; and means for integrating coherent components of said signals across each one of said passbands.

2. The signal processor, as recited in claim 1, further comprising:

means, coupled between said separating means and said detector means, for scaling each one of the signals in the plurality of channels by an estimate of background noise of the signals in said plurality of channels.

3. The processor, as recited in claim 2, wherein said separating means is a bank of bandpass filters, said passband filters corresponding to said plurality of channels, each having a frequency response corresponding to said predetermined passband characteristic, with said characteristic having a steep roll off characteristic at a high frequency portion of the passband of the bandpass filter.

4. The processor, as recited in claim 3, wherein said bank of bandpass filters comprises:

a plurality of notch filters connected in a series cascade; and a corresponding plurality of resonators with a first one of said resonators coupled between a first pair of cascade notch filters and succeeding ones of said resonators coupled between succeeding respective pairs of said notch filters.

5. The processor, as recited in claim 4, wherein said plurality of notch filters and corresponding plurality of resonators each provide corresponding bandpass filter channels with each one of said bandpass filters having a transfer characteristic related to:

$$H(z) = \frac{S}{A_2 Z^2 + A_1 Z + A_0} \cdot \frac{B_2 Z^2 + B_1 Z + B_0}{C_2 Z^2 + C_1 Z + C_0}$$

6. The processor, as recited in claim 5, wherein said resonators provide outputs of said bandpass filter.

7. The processor, as recited in claim 2, wherein said scaling means comprises:

a first automatic gain control circuit which scales the input data by an estimate of the average background noise in said data integrated over a first predetermined time interval; and a second automatic gain control circuit which scales the input data by an estimate of the average background noise in said data integrated over a second predetermined time interval.

8. The processor, as recited in claim 7, wherein said scaling means further comprises a half wave rectifier.

9. The processor, as recited in claim 8, wherein said detector means comprises:

means for integrating signals in each one of the filter banks over the number of samples in said banks; and means for integrating each one of said integrated signals over each of the channels of said bank.

10. A signal processor comprising:

a bank of bandpass filters, each one of said bandpass filters having an asymmetric filter response with each one of said bandpass filters having a passband which overlaps the passband of a preceding one of said filters;

signal compression means coupled to each one of said bandpass filters, for scaling signals from said bandpass filter by an estimate of background noise in said filtered signals; and detector means coupled to said compression means for integrating coherent components of filtered, compressed signals within each one of said channels, and for integrating said integrated component across each of said channels.

11. The system, as recited in claim 10, wherein said bandpass filter comprises:

a plurality of notch filters connected in a series cascade; and a corresponding plurality of resonators with a first one of said resonators coupled between a first pair of cascaded notch filters and succeeding ones of said resonators coupled between succeeding respective pairs of said notch filters.

12. The apparatus, as recited in claim 11, wherein said resonators provide outputs of said bandpass filter.

13. The apparatus, as recited in claim 12, wherein said compression means includes:

a first automatic gain control circuit which integrates the signal over a time interval corresponding to a first predetermined time interval; and a second automatic gain control circuit which integrates said signal over a second time interval corresponding to a second longer time interval.

14. The apparatus, as recited in claim 13, wherein said range compressor further comprises a half wave rectifier circuit.

15. The apparatus, as recited in claim 14, wherein said coincident detector circuit comprises:

means for integrating coherent components of signals in each one of said filter banks; and means for integrating coherent components of signals across each one of said filter banks.

16. A receiving system comprising:

means for receiving energy and for converting said energy into electrical signals;

means, responsive to said electrical signals, for providing a plurality of channels, each channel having a selected passband characteristic with each passband characteristic of said channels further having a high frequency passband cut-off of at least 200 dB per octave;

signal compression means, fed by each one of said plurality of signals, for scaling each of said plurality of signals by an estimate of background noise in each corresponding one of said plurality of signals; and means, fed by each one of said scaled plurality of signals from said scaling means, for integrating coherent components of said filtered compressed signal within each one of said channels and for integrating said integrated coherent signal components over each of said channels.

17. The system as recited in claim 16 wherein said means for providing said plurality of channels comprises means for providing a plurality of bandpass filters, each one of said bandpass filters having an asymmetric filter response with each one of said bandpass filters having a passband which overlaps the passband of a preceding one of said bandpass filters.

18. The system as recited in claim 17 wherein said means for providing a plurality of bandpass filters, comprises:

a plurality of notch filters connected in a series cascade; and a corresponding plurality of resonators with a first one of said resonators coupled between a first pair of cascaded notch filters and succeeding one of said resonators coupled between succeeding respective pairs of said notch filters.

19. The apparatus, as recited in claim 18, wherein said resonators provide outputs of said bandpass filter.

20. The apparatus, as recited in claim 19, wherein said compression means includes:

a first automatic gain control circuit which integrates the signal over a time interval corresponding to a first predetermined time interval; and a second automatic gain control circuit which integrates said signal over a second time interval corresponding to a second longer time interval.

21. The apparatus, as recited in claim 20, wherein said range compressor further comprises a half wave rectifier circuit.

* * * * *